United States Patent [19]

Cho et al.

[11] Patent Number: 4,817,180
[45] Date of Patent: Mar. 28, 1989

[54] IMAGE SIGNAL FILTERING

[75] Inventors: Masamichi Cho; Yasuo Kurusu, both of Kyoto, Japan

[73] Assignee: Dainippon Screen Mfg. Co., Ltd., Kyoto, Japan

[21] Appl. No.: 796,942

[22] Filed: Nov. 8, 1985

[30] Foreign Application Priority Data

Nov. 10, 1984 [JP] Japan .................................. 59-237191
Nov. 10, 1984 [JP] Japan .................................. 59-237192
Nov. 12, 1984 [JP] Japan .................................. 59-239282

[51] Int. Cl.$^4$ .............................................. G10L 3/02
[52] U.S. Cl. ........................................ 382/54; 382/27; 358/160; 364/572
[58] Field of Search ................. 358/284, 166, 37, 298, 358/75, 80, 315, 280, 282, 160; 382/54, 27; 364/572

[56] References Cited

U.S. PATENT DOCUMENTS

| | | | |
|---|---|---|---|
| 4,222,077 | 9/1980 | Yamada | 358/280 |
| 4,237,481 | 12/1980 | Aughton | 358/284 |
| 4,270,141 | 5/1981 | Sakamoto | 358/78 |
| 4,317,179 | 2/1982 | Kato et al. | 382/54 |
| 4,319,268 | 3/1982 | Yamada | 358/75 |
| 4,335,398 | 6/1982 | Yamada | 358/80 |
| 4,335,407 | 6/1982 | Atoji et al. | 358/284 |
| 4,365,304 | 12/1982 | Ruhman et al. | 358/166 |

(List continued on next page.)

FOREIGN PATENT DOCUMENTS 1557173 12/1979 United Kingdom ................. 358/166

OTHER PUBLICATIONS

Dahlberg, "Real-time Digital Image Filtering and Shading Correction" '79, pp. 104–109.

Primary Examiner—Thomas H. Tarcza
Assistant Examiner—David Cain
Attorney, Agent, or Firm—Lowe, Price, LeBlanc, Becker & Shup

[57] ABSTRACT

An image signal is filtered in one or two-dimensions for obtaining an unsharp signal in a detail emphasis process of an image reproduction system.

A one-dimensional image signal filtering is carried out in one of the main and sub-scanning directions so that the first K image signals and the other K image signals out of 2K image signals are respectively summed to obtain first and second sum signals, which are subjected to a cumulus computation to obtain a filtered signal $U_2$ expressed by:

$$U_2 = \sum_{i=1}^{1}(K - i + 1)d_i + \sum_{i=1}^{K}(K + 1 - 1)d_i - Kd_i$$

for (2K−1) image signals $d_i$ (i: K, K−1, ... 1, 0, −1, −k+2

In this regard, a cumulus computation refers to computation expressed by $p_n - Q_n + R_{n-1} = R_n$, wherein $P_n$ is an addition signal and Q is a subtraction signal where n is the input order of each of the signals and $R_{n-1}$ is the result of the previous computation.

By filtering the thus-obtained (2K−1) one-dimensionally filtered signal $U_{2i}$ (i=K, ... 1,0, −1, scanning direction factors in the same manner, a two-dimensionally filtered signal $W_2$, expressed by:

$$W_2 = \sum_{i=K}^{1}(K - i + 1)U_{2i} + \sum_{i=1}^{-K+2}(K + i - 1)U_{2i} - KU_{21}$$

is obtained to be used as an unsharp signal for the abhove-mentioned detail emphasis process. In this connection, the number 2K−1 corresponds to a mask size, which can be arbitrarily determined by adjusting the value K. By carrying out the cumulus computation in a plurality of stages, a weight coefficient of multidimensional function with respect to the value i can be imposed on image signals.

18 Claims, 21 Drawing Sheets

U.S. PATENT DOCUMENTS

| | | | |
|---|---|---|---|
| 4,368,488 | 1/1983 | Sakamoto | 358/285 |
| 4,402,006 | 8/1983 | Karlock | 358/166 |
| 4,462,043 | 7/1984 | Saitou | 358/75 |
| 4,539,478 | 9/1985 | Sano | 358/284 |
| 4,549,212 | 10/1985 | Bayer | 358/284 |
| 4,556,901 | 12/1985 | Sakamoto | 358/75 |
| 4,566,041 | 1/1986 | Shimano | 358/285 |
| 4,573,070 | 2/1986 | Cooper | 358/167 |
| 4,580,060 | 4/1986 | Takashi | 358/75 |
| 4,586,089 | 4/1986 | Nakazato et al. | 382/54 |
| 4,589,034 | 5/1986 | Yokomizo | 382/54 |
| 4,591,923 | 5/1986 | Urabe et al. | 358/284 |
| 4,613,896 | 9/1986 | Takita et al. | 358/75 |
| 4,613,986 | 9/1986 | Ataman et al. | 358/284 |
| 4,646,144 | 2/1987 | Ishida et al. | 358/75 |
| 4,647,145 | 3/1987 | Maeda et al. | 358/298 |
| 4,649,422 | 3/1987 | Rauskolb et al. | 358/284 |
| 4,663,662 | 5/1987 | Sekizawa et al. | 358/284 |
| 4,672,463 | 6/1987 | Tomohisa et al. | 382/54 |
| 4,694,342 | 9/1987 | Klees | 382/54 |

FIG. 19(b)

| Image signal $d_i$ | $d_k$ | $d_{k-1}$ | --- | $d_1$ | $d_0$ | $d_{-1}$ | --- | $d_{-k+2}$ | $d_{-k+1}$ | $d_{-k}$ |
|---|---|---|---|---|---|---|---|---|---|---|
| Position $l$ | 1 $\underset{l=k-i+1}{\overset{2}{\longleftrightarrow}}$ | --- k-1 --- | | k | k-1 | --- $\underset{l=k+i-1}{\overset{2}{\longleftrightarrow}}$ --- | 1 | 0 | |
| Subscript j attached to V.L | k | k-1 | | 1 | 0 | 1 | | --- | -k+1 | -k |

$U_2$ $U_{2a}$ $U'_{2b}(U_{2b})$ $2U''_a$ $2U'''_{2b}$ $U_6$ $U_7$

IMAGE SIGNAL FILTERING

FIELD OF THE INVENTION

The present invention relates to a filtering process of an image signal, and more particularly, to a method of and apparatus for filtering an image signal in producing an unsharp signal used for a process of detail emphasis.

BACKGROUND OF THE INVENTION

A detail (sharpness) emphasis process of an electronic image reproduction is achieved by carrying out a computation $S+k(S-U)$ (where k is a coefficient) wherein S is a sharp signal representing the density of a pixel presently being processed, while U is an unsharp signal representing the average density of a plurality of pixels surrounding the present pixel. In this regard, an analog unsharp signal U can be optically obtained by using a scanning beam the aperture of which is broader than that used for obtaining the sharp signal S. However this method has a fatal drawback of requiring an independent optical system for obtaining the unsharp signal U, other than that for the sharp signal S. In addition, the beam aperture for the sharp signal S is required to be varied according to the sort of an image (drawing or gradated image) from which an image signal is obtained, a magnification ratio to be employed, and a screen ruling in reproducing halftone dots. Therefore, inevitably the aperture for the unsharp signal U most be similarly varied. Such a system is complicated and the operation procedures are time-consumptive.

For the purpose of solving these defects, Japanese patent application No. 54-82571 discloses a method of a digital detail emphasis process, and U.S. patent application Ser. No. 573,967 discloses an improvement of the above identified method.

In either method, an averaging circuitry or a combination of a self-multiplier and an adder is employed to process image signals of a group of pixels arranged in accordance with the scanning order, to each of which is applied a weighting coefficient.

Since the image signal filtering circuitry (an unsharp signal producing circuitry) employs multipliers or adders corresponding to the aperture size (physical mask size) of the unsharp signal, the greater the aperture for obtaining the unsharp signal, the more multipliers or the adders that must be employed. Furthermore, either method is accompanied by an inconvenience that identical circuits are necessary for each change of a weight coefficient to be imposed on the image signal.

SUMMARY OF THE INVENTION

Accordingly, it is an object of the present invention to provide a method of and apparatus for filtering an image signal free of the above-mentioned drawbacks.

Another object of the present invention is to provide such a method and apparatus free of the need for increasing the number of elements, such as adders, comprised in computation devices to cope with the increase of the number of image signals (corresponding to aperture size in analog signal processing) to be subjected to the image signal filtering process at a time.

A further object of the present invention is to provide such a method and apparatus capable of freely varying the number of image signals to be subjected to the image signal filtering process at a time.

In order to implement the above objects, the present invention adopts the following techniques.

It is prepostulated that a cumulus computation of the present invention means that two signals $P_n$ and $Q_n$ and the previous computation result signal $R_{n-1}$ (where n is the input order or computation number of the signals) are combined in a computation according to the equation:

$$R_n = R_{n-1} + P_n - Q_n.$$

It is stipulated in this specification that the aforesaid computation of the cumulus computer is described as "the signals $P_n$ and $Q_n$ are put to a cumulus computation" hereinafter for the sake of convenience.

An unsharp signal is obtained by processing image signals of a matrix of pixels (arranged in two dimensions), when the image data is firstly filtered in one of the one-dimensional main and the sub-scanning direction factors, and then the one-dimensionally filtered signal is further processed in the other direction.

In regard to the one-dimensional filtering process, first a certain number (k) of image signals $d_i$, ($i=k, \ldots 1$) out of 2k image signals in a sequence successively obtained from an input scanning are summed to produce a first sum signal $U_{1a}$ according to an equation:

$$U_{1a} = \sum_{i=k}^{1} d_i,$$

meanwhile, the other k image signals $d_i$ ($i=0, \ldots -k+1$) are summed to produce a second sum signal $U_{1b}$ according to an equation:

$$U_{1b} = \sum_{i=0}^{-k+1} d_i.$$

Secondly, the first and the second sum signals are put to a cumulus computation to obtain a filtered signal $U_2$ expressed by an equation:

$$U_2 = \sum_{i=k}^{1} (k - i + 1) d_i + \sum_{i=1}^{-K+2} (k + i - 1) d_1 - k d_1. \quad (31)$$

The first and the second sum signals can be obtained in accordance with any of the following methods.

In one method, firstly (2k+1) image signals are temporarily stored in a signal storage means such as a shift register, and then the first image signal and the (k+1)th image signal are out of the (2k+1) image signals are put to a cumulus computation, as addition and subtraction signals respectively, to obtain the first sum signal. Meanwhile, the (k+1)th image signal and the (2k+1)th image signal are put to another cumulus computation, as addition and subtraction signals respectively, to obtain the second sum signal.

In another method, firstly 2k image signals are temporarily stored in a signal storage means such as a shift register, and then the first through kth image signals out of 2k image signals are input to adders in a tree arrangement of several stages to be successively added to to an adjoining image signal until the first sum signal is formed. Meanwhile, the (k+1)th through 2kth image signals are input to other adders of the same construction as above until the second sum signal is formed.

In view of the fact that the second sum signal is delayed in phase by k computations from the first sum signal, the first sum signal can be delayed in phase by k computations to cause the second sum signal to be output in synchronism with the present first sum signal. In this case, the first sum signal is obtained first by temporarily storing (k+1) image signals $d_i$ in a first signal storage means, and then by putting the first image signal $d_k$ and the (k+1)th signal $d_O$ to a cumulus computation as respective addition and subtraction signals. The first sum signal can also be obtained by successively carrying out additions of several stages between adjoining two of k image signals temporarily stored in the signal storage means. The thus-obtained first sum signal is input to a second signal storage means having a siganl shifting function and then output as the second sum signal after k computations.

The aforesaid equation (31) can be obtained by a combination of the equations:

$$\sum_{i=k}^{1} (k - i + 1) d_i = U_{2a} \quad (32)$$

$$\sum_{i=1}^{-k+2} (k + i - 1) d_i = U_{2b}. \quad (33)$$

More particularly, the first sum signal $U_{1a}$ is first obtained according to one of the said methods, and then the first sum signal $U_{1a}$ and signal $kd_O$ obtained by multiplying the (k+1)th image signal $d_O$ by k are put to a cumulus computation, respectively as addition and subtraction signals, to obtain the filtered signal $U_{2a}$.

The filtered signal $U_{2b}$ can also be obtained by putting the first sum signal $U_{1a}$ and a signal $kd_k$ obtained by multiplying the first image signal $d_k$ by k to a cumulus computation, respectively as subtraction and addition signals, to obtain a signal $U'_{2b}$ expressed by an equation:

$$U'_{2b} = \sum_{i=k}^{1} i \cdot di$$

which is advanced in phase by k computations from the filtered signal $U_{2b}$, and by delaying the signal $U'_{2b}$ in phase by k computations.

Since the equation (31) can be expressed by an equation:

$$U_2 = U_{2a} + U_{2b} - kd_1 \quad \text{- - - (34),}$$

the filtered signal $U_2$ corresponding to (2k−1) image signals represented by the equation (31) can be obtained by carrying out the equation (34) according to the filtered signals $U_{2a}$ and $U_{2b}$.

Since the signal $U_{2b} - kd_1$ comprised in the equation (34) can also be obtained by shifting by k computations the resultant of a computation $kU_{1a} - U_{2a}$ using the filtered signals $U_{1a}$ and $U_{2a}$, the filtered signal $U_2$ represented by the equation (31) can be obtained by summing the signal $U_{2b} - kd_1$ and the filtered signal $U_{2a}$.

The filtered signal $U_2$ represented by the equation (31) can be obtained for image signals comprised in either the main scanning or the sub-scanning direction. To obtain the signal $U_2$ filtered in the main scanning direction factor, a shift register may be used comprising a number of elements corresponding to the number of the image signals to be subjected to the filtering process.

To obtain the signal $U_2$ filtered in the sub-scanning direction factor, a necessary number of line memories (or shift registers) are arranged in cascade, each unit of which can store image signals of one scanning line, thereby the image signals comprised in the sub-scanning direction are simultaneously output from each unit of the line memories (or shift registers).

As mentioned before, there must be carried out signal filtering processes in both the main and the sub-scanning directions to obtain an unsharp signal. For that reason, an image signal $d_i$ is filtered in one of the main and the sub-scanning direction factors, and then the obtained filtered signal $U_{21}$ is further filtered in the other direction factor.

In accordance with the signal $U_{2a}$ expressed by the equation (32) and a signal $U''_{2b}$ expressed by the equation:

$$U''_{2b} = \sum_{i=o}^{-k+1} (k + i - 1) d_i,$$

which is delayed in phase by one computation from the signal $U_{2b}$ of the equation (33), each of which is comprised in the equation (31), the following filtered signal can be obtained.

When signals $U_{5a}$ and $U_{5b}$ respectively expressed by equations:

$$U_{5a} = 2U_{2a} - U_{1a}$$

and $$U_{5b} = 2U''_{2b} - U_{1b}$$

are put to a cumulus computation, a filtered signal $U_6$ expressed by an equation:

$$U_6 = \sum_{i=k}^{1} (k - i + 1)^2 d_i + \sum_{i=1}^{-k+2} (k + i - 1)^2 d_i - k^2 d_1$$

can be obtained. Additionally a filtered signal $U_7$ expressed by an equation:

$$U_7 = \sum_{i=k}^{-k+2} \{k^2 - (i - 1)^2\} d_i$$

can be obtained by the cumulus computation of the filtered signals $U_2$ and $U_6$.

In the above connection, the number of image signals to be simultaneously put to a signal filtering process can be easily varied by controlling the number of image signals (or one-dimensionally filtered image signals) to be simultaneously registered in a shift register. For the purpose, switching means are used for controlling the output from the shift register.

It is incidentally noted that the addition and the subtraction signals can be reversed in being put to a cumulus computation, where the two's complement of the computation resultant must be taken instead to obtain the same result as above.

As can be understood from the above description, each embodiment of the present invention has an advantage of being made up of signal storage means and cumulus computers, rather than expensive multipliers. Particularly, the embodiments in wich the second sum signal $U_{1b}$ is obtained by delaying the first sum signal $U_{1a}$ in phase by k computations are capable of employing a reduced number of cumulus computers, which leads to still a higher cost performance.

The embodiments in which multipliers are used in part have the same merit because the number of the multipliers employed is limited, regardless of the number of image signals to be filtered.

The embodiments in which the adder groups in tree arrangements of several stages are used also have the same merit because they are free of a lot of multipliers, and furthermore the number of the adder groups can be reduced to one when the second sum signal is obtained by delaying the phase of the first sum signal.

The mask size of an unsharp signal can be varied by varying the interval between two image (pixel) signals to be simultaneously put to a cumulus computation (the number of image (pixel) signals to be summed) without making large-scale alterations in the apparata of the present invention, so that no additional cumulus computers are necessary.

Furthermore, the image signals may be weighted by means of weight coefficients C, which have a ratio to values 1 representative of the position of the image signals that form a function of arbitrary rational integers, by changing the number of cumulus computation stages.

The above and other objects and features of the present invention can be appreciated more fully from the following detailed description when read with reference to the accompanying drawings.

DETAILED DESCRIPTION OF A PREFERRED EMBODIMENT OF THE INVENTION

Figure 18:
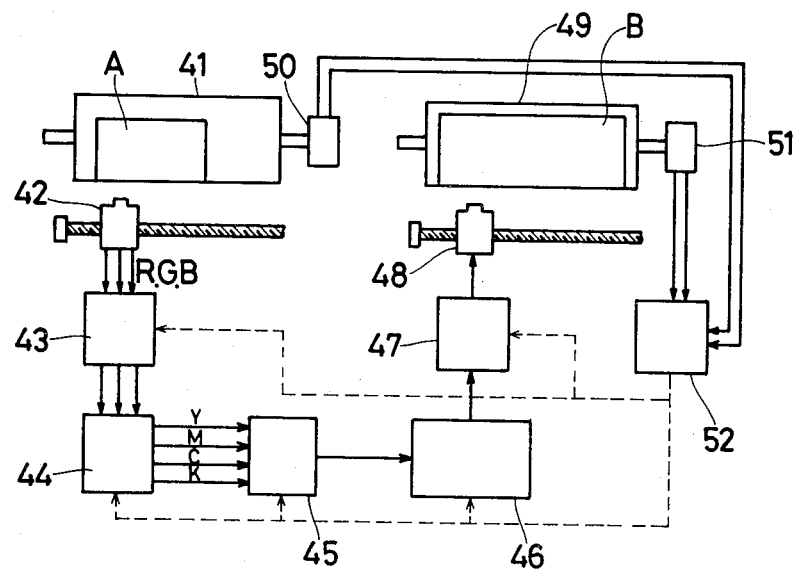
FIG. 18 shows a block diagram of an image reproduction system to which the present invention is applied..

FIG. 18 shows an image reproduction system to which the present invention is applied. In the apparatus of FIG. 18, an original A mounted on an original drum 41 is scanned by an input head 42 which generates three analog color component signals R (Red), G (Green) and B (Blue) in correspondence with the image of the original.

The analog color component signals R, G and B are converted to corresponding digital signals by an A/D converter 43 (or, in analog form without processing by the A/D converter 43) and are input to a digital (or analog) color computer 44 which carries out a color and gradation correction for the digital color component signals R, G and B and converts the same to four color separation signals Y (Yellow), M (Magenta), C (Cyan) and K (Black). It should be incidentally noted that when the color component signals R, G and B are input to an analog color computer 44 as analog signals, the output signals of the color computer 44 are converted to corresponding digital signals by an A/D converter (not shown).

Desired ones of the color separation signals Y, M, C and K to be reproduced are selected by a color separation selector 45 which controls the number of color separations to be recorded, and undergo a detail emphasis in a detail emphasis circuitry 46 as mentioned afterwards. An output signal of the detail emphasis circuitry 46 is input via a halftone dot generator 47 to a recording head 48 to be used to record the selected color separation(s) on a photosensitive film B mounted on a recording drum 49.

In the above, each of the digital circuits is controlled by a clock pulse signal produced by a timing controller 52 which processes timing pulses output from rotary encoders 50 and 51 connected respectively to the original drum 41 and to the recording drum 49. The detail emphasis circuitry 46 comprises a built-in image signal filter, in which an input signal is filtered by using an unsharp signal U and a sharp signal S.

It is postulated in the present invention that a filtering process for obtaining an unsharp signal is carried out for every pixel matrix composed of $(2k-1)$ pixels situated in the main scanning direction by $(2k-1)$ pixels situated in the sub-scanning direction as shown in FIG. 19($a$) wherein k is an arbitrary number.

It is further postulated in the present invention that $(2k+1)$ image signals comprised in the main or the sub-scanning direction are filtered in one process and the same operation is carried out successively. In order to clarify the following description, a sign $d_i$ ($i=k, k=1, \ldots 0, \ldots -k+1, -k$ in the inverse direction of the main or sub-scanning direction) is attached to each of the image signals to be subjected to a filtering process at one time.

There are other several noteworthy postulations as follows in the description of this specification.

The aforesaid subscript i is attached to image signal d of both the main and the sub-scanning directions.

Since there is a need for specifying the position l of a specific image signal $d_i$ in equations expressing the relation between the image signal $d_i$ and signals obtained through a filtering process, the relation between the image signal $d_i$ and the position l is shown in FIG. 19($b$).

Since an image signal $d_i$ is stored into $(2k+1)$ shift registers (or line memories) in the first stage of the filtering process, each of the shift registers V (or line memories L) is expressed with a corresponding subscript i ($i=k, k-1, \ldots 0, \ldots -k+1, -k$ in the inverse direction of the main or sub-scanning directions) attached as shown in FIG. 19($b$) to clarify the relation between the two.

The first element $V_k$ of the shift registers (or the first element $L_k$ of the line memories) shown in the drawings concerned provided for the sake of explanation can be omitted.

Figure 20A:
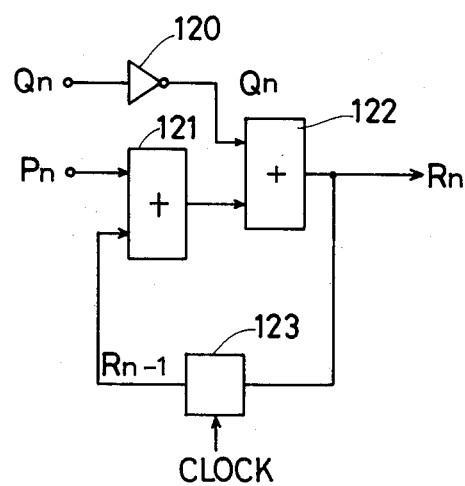
FIG. 20 shows an embodiment of a cumulus computer.
Figure 20:
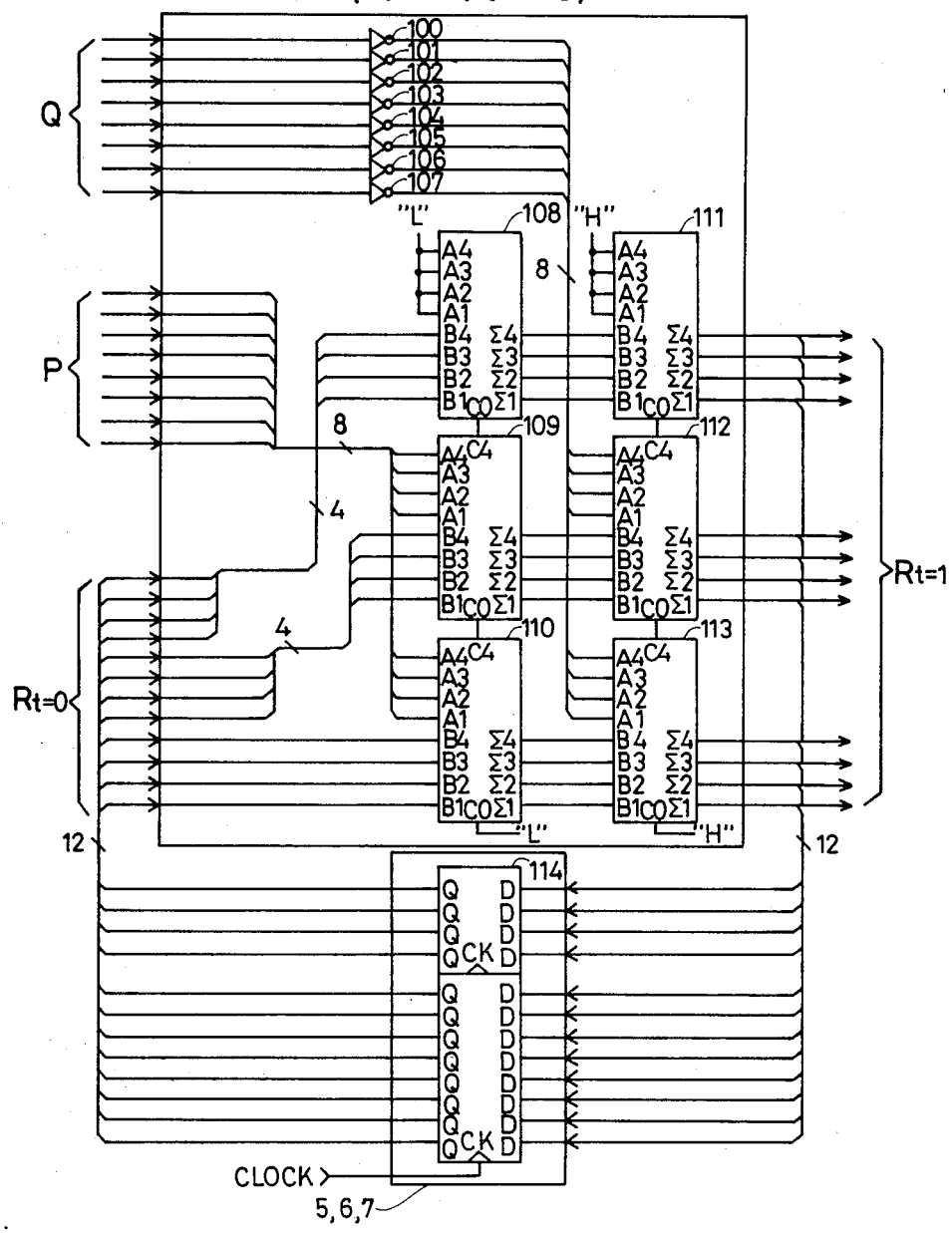

Before describing embodiments of the present invention, a cumulus computer to be employed therein is explained below according to FIG. 20(a).

First of all, an adder 121 sums the signals input thereto, representing an addition signal $P_n$ (where n is the number of input signals) and the previous cumulus signal $R_{n-1}$ temporarily stored in a register 123. Then an adder 122 sums the output signal of the adder 121 and an inverted signal $-Q_n$ obtained by inverting a subtraction signal $Q_n$ by an inverter 120 to output a signal $R_n$ expressed by an equation:

$$R_n = R_{n-1} + P_n - Q_n \qquad \cdots (10).$$

The thus-obtained output signal $R_n$ is temporarily stored in register 123, such as flip-flop circuitry, to be subjected to the next (n+1) computation which is the same as the previous computation. It should be noted here that each of the signals $P_n$ and $Q_n$ is concretely an image signal $d_i$ obtained by scanning an original or a filtered signal $U_{2i}$ obtained by way of a one-dimensional filtering in the present invention. In order to keep synchronism with the image signal $d_i$ input to the adder 121, the said register 123 is controlled by a clock pulse signal synchronized with the scan of the original image.

Assuming that the signal $Q_n$ is an addition signal and the signal $P_n$ is a subtraction signal, in the above computation, the equation (1) is modified to an equation:

$$-R_n = -R_{n-1} + Q_n - P_n \qquad \cdots (10)'.$$

In view of the equations (10) and (10)', either of the two signals $P_n$ and $Q_n$ can be an addition signal (when the other is also a subtraction signal) because the value $-R_n$ is the two's complement of the value $P_n$.

Figure 1:
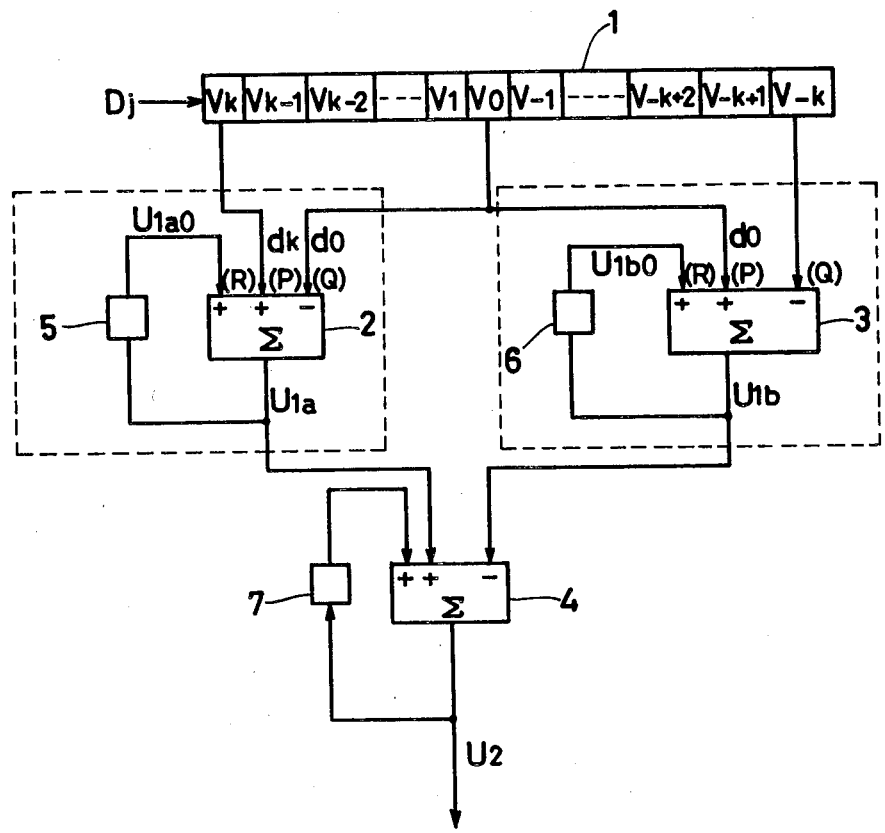
FIGS. 1, 2, 3, 4 and 5 show embodiments of the present invention for filtering an image signal in the main scanning direction factor.

FIG. 1 shows an image signal filtering apparatus of the present invention for filtering an image signal in one dimension in the main scanning direction.

In the apparatus of FIG. 1, a one-directional component of a color separation signal, for instance, a main scanning direction component signal $D_j$ (where j is the input number to a shift register 1) obtained from the said color separation selector 45, is input to (2k+1) elements $V_i$ (i=k, k−1, ... 1, 0, −1, ... −k) of the shift register 1, consequently image signal $d_i$ is stored in the element $V_i$ of the shift register 1.

The image signal $d_k$ stored in the first element $V_k$ of the shift register 1 is input to a cumulus computer 2 as an addition signal. In the meantime, the image signal $d_O$ (delayed in phase by k elements from the image signal $d_k$) stored in the element $V_O$ of the shift register 1 is input to the cumulus computer 2 as a subtraction signal as well as to another cumulus computer 3 as an addition signal.

The image signal $d_{-k}$ (delayed in phase by 2k elements from the image signal $d_k$) stored in the last element $V_{-k}$ is also input to the cumulus computer 3.

The cumulus computer 2 carries out the computation of the equation (10) repeatedly, and finally outputs a signal $U_{1a}$ expressed by an equation:

$$U_{1a} = \sum_{i=k}^{1} d_i, \qquad (1)$$

which represents the sum of a certain consecutive number (k) of image signals (density values) $d_k$ through $d_1$ in the main scanning direction factor stored respectively in the elements $V_k$ through $V_1$ of the shift register 1. The thus-obtained signal $U_{1a}$ of the sum is called the "first sum signal" hereinafter. The first sum signal $U_{1a}$ is input to another cumulus computer 4 as an addition signal as well as to a register 5 to be used for the next computation as a cumulus signal $U_{1aO}$ expressed by an equation:

$$U_{1aO} = \sum_{i=k-1}^{O} d_i. \qquad (1)'$$

On the other hand, the cumulus computer 3 outputs a signal $U_{1b}$ expressed by an equation:

$$U_{1b} = \sum_{i=0}^{-k+1} d_i, \qquad (2)$$

which represents the sum of a certain consecutive number (k) of image signals (density values) $d_O$ through $d_{-k+1}$ in the main scanning direction factor stored respectively in the elements $V_O$ through $V_{-k+1}$ of the shift register 1. The thus-obtained signal $U_{1b}$ is called the "second sum signal" hereinafter. The second sum signal $U_{1b}$ is input to the cumulus computer 4 as a subtraction signal as well as to a register 6 to be used for the next computation as a cumulus signal $U_{1bO}$ expressed by $$U_{1bO} = \sum_{i=-1}^{-k} d_i. \qquad (2)'$$

Figure 21A:
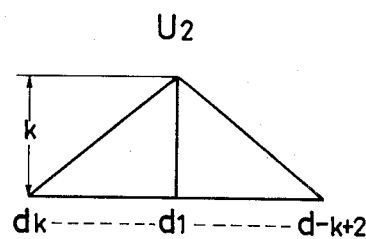
FIG. 21 shows conceptual drawings of coefficients imposed on image signals.

The first and the second sum signals $U_{1a}$ and $U_{1b}$ are put to a cumulus computation by the cumulus computer 4 according to the equation (10), consequently the cumulus computer 4 outputs a filtered signal $U_2$ (refer to FIG. 21(a)) expressed by an equation:

$$U_2 = d_k + 2d_{k-1} + 3d_{k-2} + \ldots \\ + (k-1)d_2 + k \cdot d_1 + (k-1)d_0 + \ldots \\ + 2d_{-k+3} + d_{-k+2} \qquad (3).$$

The filtered signal $U_2$ is registered in a register 7 to be used for the next computation.

As can be understood from the equation (3), the apparatus of FIG. 1 outputs a filtered signal characterized in that 2k−1 image (density) signals situated in the main scanning direction are assigned weight coefficients c=1 (refer to FIG. 19(b)) which increase linearly from the image signals situated at both the edges to the kth image signal.

It should be incidentally noted in regard of the above that the shift register 1, the cumulus computers 2, 3 and 4, and the registers 5, 6 and 7 are all their initialized before the operations. Table 1 shows several stages of the outputs of the cumulus computers 2, 3 and 4 with respect to the successive input of the image signal $D_j$ from the initial state, and the final formation of the filtered signal expressed by the equations (1), (2) and (3).

TABLE I

| # of clock pulses | $V_k$ | $V_{k-1}$ | $V_{k-2}$ | ... | $V_1$ | $V_0$ | $V_{-1}$ | ... | $V_{-k+1}$ | $V_{-k}$ | CUMULUS COMPUTER 2 | CUMULUS COMPUTER 3 | CUMULUS COMPUTER 4 |
|---|---|---|---|---|---|---|---|---|---|---|---|---|---|
| 1 | $D_1$ | 0 | 0 | ... | 0 | 0 | 0 | ... | 0 | 0 | $D_1$ | 0 | $D_1$ |
| 2 | $D_2$ | $D_1$ | 0 | ... | 0 | 0 | 0 | ... | 0 | 0 | $D_1+D_2$ | 0 | $D_2+2D_1$ |
| 3 | $D_3$ | $D_2$ | $D_1$ | ... | 0 | 0 | 0 | ... | 0 | 0 | $D_1+D_2+D_3$ | 0 | $D_3+2D_2+3D_1$ |
| 4 | $D_4$ | $D_3$ | $D_2$ | ... | 0 | 0 | 0 | ... | 0 | 0 | $D_1+D_2+D_3+D_4$ | 0 | $D_4+2D_3+3D_2+4D_1$ |
| . | . | . | . |  | . | . | . |  | . | . | . | . | . |
| $k$ | $D_k$ | $D_{k-1}$ | $D_{k-2}$ | ... | $D_1$ | 0 | 0 | ... | 0 | 0 | $D_1+D_2+...+D_{k\pm 1}+D_k$ | 0 | $D_k+2D_{k-1}+3D_{k-2}+...+(k-1)D_2+kD_1$ |
| $k+1$ | $D_{k+1}$ | $D_k$ | $D_{k-1}$ | ... | $D_2$ | $D_1$ | 0 | ... | 0 | 0 | $D_2+D_3+...+D_k+D_{k+1}$ | $D_1$ | $D_{k+1}2D_k+...+(k-1)D_3+kD_2+(k-1)D_1$ |
| $k+2$ | $D_{k+2}$ | $D_{k+1}$ | $D_k$ | ... | $D_3$ | $D_2$ | $D_1$ | ... | 0 | 0 | $D_3+D_4+...+D_{k+1}+D_{k+2}$ | $D_1+D_2$ | $D_{k+2}2D_{k+1}+...+(k-1)D_4+kD_3+(k-1)D_2+(k-2)D_1$ |
| . | . | . | . |  | . | . | . |  | . | . | . | . | . |
| $2k-1$ | $D_{2k-1}$ | $D_{2k-2}$ | $D_{2k-3}$ | ... | $D_k$ | $D_{k-1}$ | $D_{k-2}$ | ... | 0 | 0 | $D_k+D_{k+1}+...+D_{2k-1}$ | $D_1+D_2+...+D_{k-2}+D_{k-1}$ | $D_k2D_{k-1}+...+(k-1)D_k=1+kD_k+(k-1)D_{k+1}+...+D_{2k-1}$ |
| $2k$ | $D_{2k}$ | $D_{2k-1}$ | $D_{2k-2}$ | ... | $D_{k+1}$ | $D_k$ | $D_{k-1}$ | ... | $D_1$ | 0 | $D_{k+1}D_{k+2}+...+D_{2k}$ | $D_1+D_2+...+D_{k-1}+D_k$ | $D_2+2D_3+...+(k-1)\cdot D_{k+1}+kD_{k+1}+(k-1)\cdot D_{k+2}+...+D_{2k}$ |
| $2k+1$ | $D_{2k+1}$ | $D_{2k}$ | $D_{2k-1}$ | ... | $D_{k+2}$ | $D_{k+1}$ | $D_k$ | ... | $D_2$ | $D_1$ | $D_{k+2}+D_{k+3}+...+D_{2k+1}$ | $D_2+D_3+...+D_k+D_{k+1}$ | $D_3+2D_4+...+(k-1)\cdot D_{k+1}+kD_{k+2}+(k-1)\cdot D_{k+3}+...+D_{2k+1}$ |
| # of clock pulses | $V_k$ | $V_{k-1}$ | $V_{k-2}$ | ... | $V_1$ | $V_0$ | $V_{-1}$ | ... | $V_{-k+1}$ | $V_{-k}$ | CUMULUS COMPUTER 2 | CUMULUS COMPUTER 3 | CUMULUS COMPUTER 4 |

$V_i$ (i: k, k-1, ..., 1, 0, -1, ..., -k) is the number of the elements of a shift register
$D_i$ (i: the input order 1, 2, 3, ...) is an image signal (transistional) input to a shift register In Table 1, the subscript j attached to the image signal D is intended to express the number of input thereof to the shift register 1. Therefore, the subscript j is not related to the subscript i attached to the said image signal d.

As is obvious from Table 1, the output of the cumulus computer 4 after the input of the $2k-1$ image signals to the shift register 1 becomes equivalent to the filtered signal $U_2$ corresponding to the equation (3).

Figure 2:
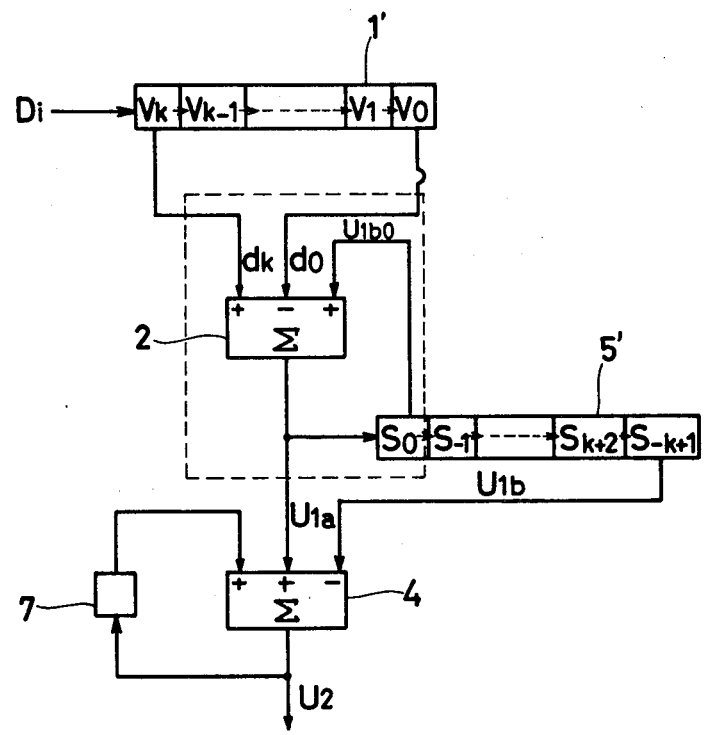

FIG. 2 shows a modification of the apparatus of FIG. 1, in which the cumulus computer 3 is replaced by a shift register 5'. In view of the fact that the second sum signal $U_{1b}$ input to the cumulus computer 4 is delayed in phase by k elements of the shift register 1 from the first sum signal $U_{1a}$ (the other input to the cumulus computer 4), the operation of the apparatus of FIG. 2 is equivalent to that of the apparatus of FIG. 1.

More precisely comparing the construction of the apparatus of FIG. 2 with respect to that of the apparatus of FIG. 1, a shift register 1' comprising $(k+1)$ elements is employed instead of the register 1 comprising $(2k+1)$ elements; an image signal $d_k$ registered in the first element $V_k$ of the shift register 1' is used as an addition signal; an image signal $d_O$ registered in the last element $V_O$ of the shift register 1' is used as a subtraction signal; the first element $S_O$ of a shift register 5' (mentioned in greater detail afterwards) is substituted for the register 5; and an image signal registered in the element $S_O$ is used as a cumulus signal to the cumulus computer 2. As is obvious from the above description, the devices relevant to the cumulus computer 2 of FIGS. 1 and 2 are constructed substantially identically, therefore, the cumulus computer 2 of FIG. 2 also outputs the first sum signal $U_{1a}$ corresponding to the euqation (1) as mentioned before. The first sum signal $U_{1a}$ output from the cumulus computer 2 is input to the subsequent cumulus computer 4 as an addition signal as well as to a shift register 5' comprising k elements $S_i (i=0, -1, \ldots k+1)$ successively. The signal registered in the first element $S_O$ of the shift register 5' is input to an addition terminal of the cumulus computer 2 as a cumulus signal $U_{1a0}$, while the signal registered in the last element $S_{-k+1}$ of the shift register 5' is input to the cumulus computer 4 as a subtraction signal. Since there is output from the last element $S_{-k+1}$ of the shift register 5' the second sum signal $U_{1b}$ which is delayed in phase from the first sum signal $U_{1a}$ by k elements of the shift register 1', the filtered signal $U_2$ corresponding to equation (3) can be obtained from the cumulus computer 4. The apparatus of FIG. 2 is effective for the reason that it functions substantially identically to the apparatus of FIG. 1 while having a simpler construction.

The following is a study of the equation (3), wherein the equation is considered in regard of the terms $d_k$ through $d_1$ and the terms $d_1$ through $d_{-k+2}$.

The equation (3) can be reexpressed as:

$$U_2 = [d_k + 2d_{k-1} \ldots (k-1) d_2 + k \cdot d_1] + \qquad (31)$$

$$[k \cdot d_1 + (k-1) d_O + \ldots + 2d_{-k+3} + d_{-k+2}] - k \cdot d_1 =$$

$$\sum_{i=k}^{1} (k - i + 1) d_i + \sum_{i=1}^{-k+2} (k + i - 1) d_i - k \cdot d_1.$$

Assuming:

$$U_{2a} = \sum_{i=k}^{1} (k - i + 1) d_i \qquad (32)$$

and $$U_{2b} = \sum_{i=1}^{-k+2} (k + i - 1) d_i, \qquad (33)$$

the filtered signal $U_2$ is expressed as:

$$U_2 = U_{2a} + U_{2b} - k \cdot d_1 \qquad (34).$$

Figure 21B:
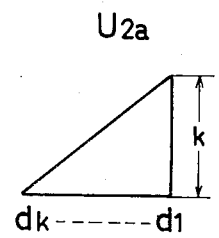
Figure 21C:
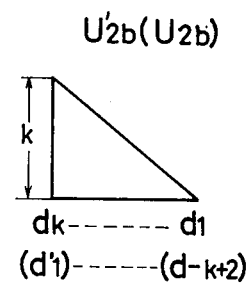

Therefore, the filtered signal $U_2$ can be synthesized by using separately-obtained signals $U_{2a}$ and $U_{2b}$ (refer to FIGS. 21(b) and (c)).

Figure 3:
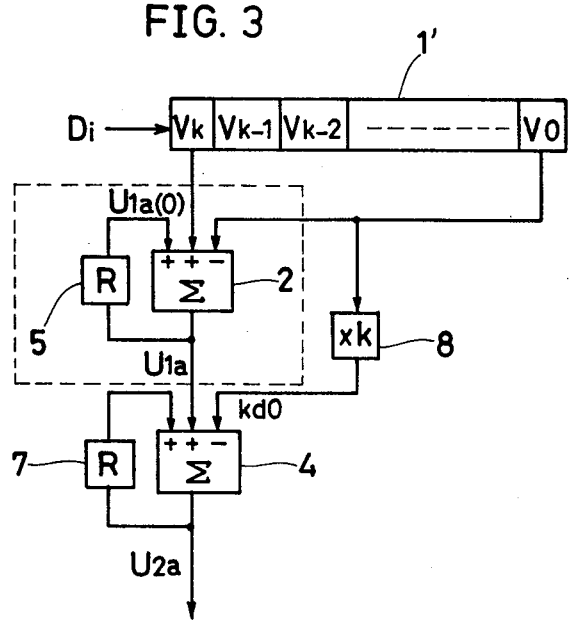
Figure 4:
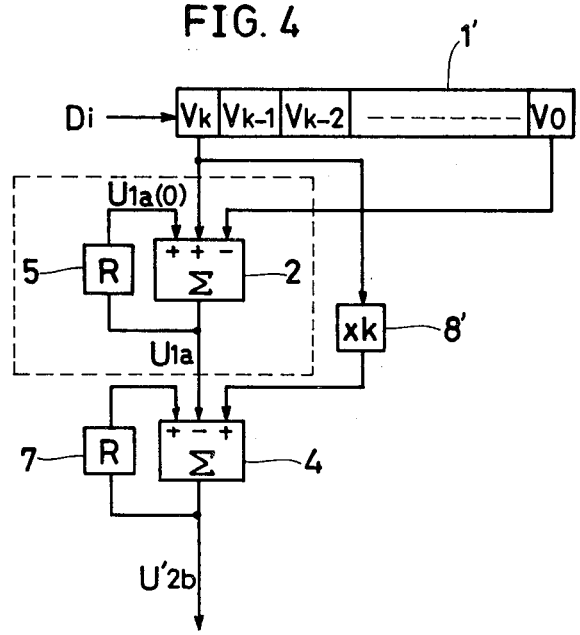

The signals $U_{2a}$ and $U_{2b}$ can be obtained respectively by apparata as shown in FIGS. 3 and 4.

In the apparatus of FIG. 3, the cumulus computer 2 carries out a cumulus computation according to the equation (1) by receiving the image signal $d_k$ registered in the first element $V_k$ of the shift register 1' comprising $(k+1)$ elements and the image signal $d_O$ registered in the last element $V_O$ of the same, as addition and subtraction signals respectively, as mentioned with reference to the apparatus of FIG. 1. Therefore, the cumulus computer 2 outputs the first sum signal $U_{1a}$ to a subsequent cumulus computer 4 as an additional signal. On the other hand, the image signal $d_O$ registered in the last element $V_O$ of the shift register 1' is input to the cumulus computer 2 as a subtraction signal as well as to a multiplier 8 to be multiplied a certain number of times (by k). The output of the multiplier 8 is input to the cumulus computer 4, which puts the two input signals $U_{1a}$ and $Kd_O$ to a cumulus computation to produce the signal $U_{2a}$.

In the apparatus of FIG. 4, the first cumulus computation is the same as in the apparatus of FIG. 3. Therefore, the first sum signal $U_{1a}$, which is the computation resultant of the equation (1), is input to the register 5 from the cumulus computer 2, so that it is employed as a sum signal $U_{1a0}$ during the next computation and, on the other hand, is input to the cumulus computer 4 as a subtraction signal. Therefore, the cumulus computer 2 outputs the first sum signal $U_{1a}$, the computation resultant of the equation (1), to the cumulus computer 4 as a subtraction signal. Meanwhile, the image signal $d_k$ registered in the first element $V_k$ of the shift register 1' is multiplied by k to be input to the cumulus computer 4 as an addition signal. The cumulus computer 4 puts the two input signals $U_{1a}$ and $kd_k$ to a cumulus computation to produce a signal $U'_{2b}$ expressed by an equation:

$$U'_{2b} = \sum_{i=k}^{1} i d_i. \qquad (35)$$

It is obvious from the equations (33) and (35) that the signal $U'_{2b}$ is advanced in phase by $k-1$ elements of the register 1' from the said signal $U_{2b}$. Therefore, in order to obtain the signal $U_2$ by synthesizing, or combining, the signals $U_{2a}$ and $U'_{2b}$, an apparatus for the synthesis must be so constructed that firstly the signal $U_{2b}$ is obtained by delaying in phase the signal $U'_{2b}$ by $k-1$ elements of the shift register 1' and then the signals $U_{2a}$ and $U_{2b}$ are subjected to a computation corresponding to the equation (34).

Figure 5:
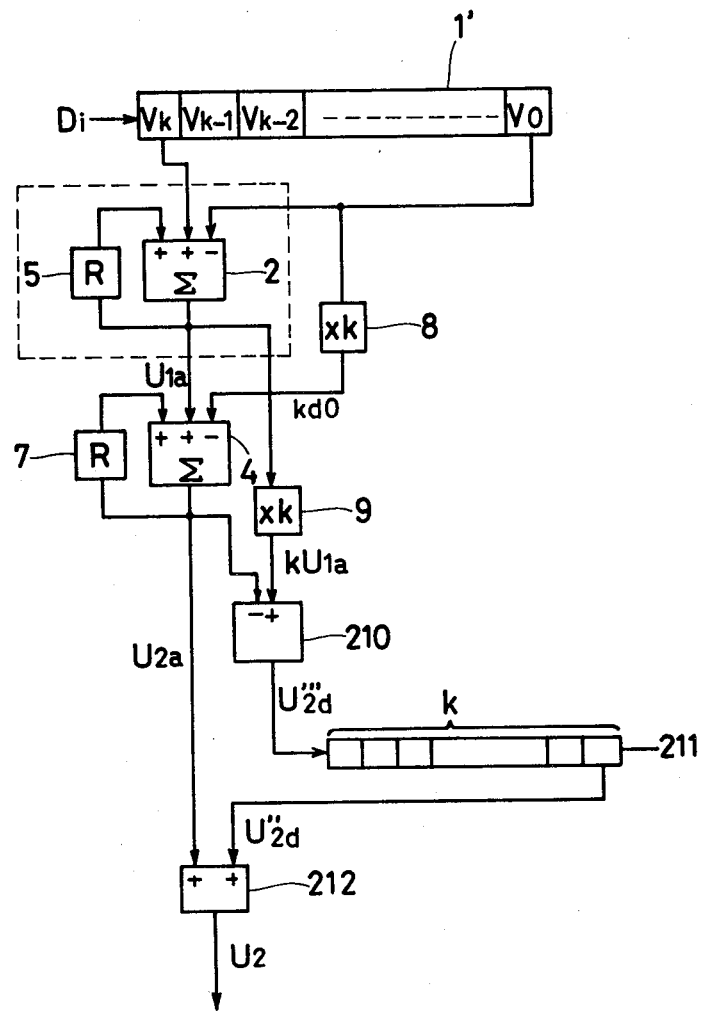

FIG. 5 shows a block diagram of another embodiment of the present invention for filtering an image signal one-dimensionally. In the apparatus of FIG. 5 comprising the same apparatus of FIG. 3 consisting of a shift register 1', cumulus computers 2 and 4, registers 5 and 7, and a multiplier 8, firstly the said signal $U_{2a}$ is obtained from the cumulus computer 4. Then the signal $U_{2a}$ is subtracted in a subtractor 210 from a signal $k \cdot U_{1a}$ obtained by multiplying the first sum signal $U_{1a}$ from the cumulus computer 2 by k (corresponding to the interval k between two image signals put to a cumulus computation of the cumulus computer 2) in a multiplier 9. For this reason, there is output a signal representative of an equation:

$$k \cdot U_{1a} - U_{2a} = \qquad (36)$$

$$\sum_{i=k}^{1} k \cdot d_i - \sum_{i=k}^{1}(k-i+1)d_i = \sum_{i=k}^{2}(i-1)d_i$$

from the subtractor 210. Then by delaying in phase the output signal of the subtractor 210 by k elements of a shift register 211, the signal representative of $$\sum_{i=k}^{2}(i-1)d_i$$

as shown in the equation (36) is changed into a signal representative of $$\sum_{i=0}^{-k+2}(k+i-1)d_i.$$

This signal can be reexpressed as:

$$\sum_{i=0}^{-k+2}(k+i-1)d_i = \sum_{i=1}^{-k+2}(k+i-1)d_i - k \cdot d_1 \qquad (37)$$
$$= U_{2b} - k \cdot d_1$$

which means that the second and the third terms of the right member of the equation (34) is obtained. Then the filtered signal $U_2$ is obtained by summing the signal $U_{2a}$ output from the cumulus computer 4 and the signal representing $U_{2b}-k \cdot d_1$ output from the last element of the shift register 211 in an adder 212.

Aside from the aforesaid embodiments in which an image signal is filtered in the main scanning direction factor, the present invention is also capable of filtering an image signal in the sub-scanning direction factor in the following manner. It is assumed in the following description that the equivalents of the aforesaid signals $U_{1a}$, $U_{1b}$, $U_2$ and so forth output from cumulus computers are expressed in the same terms, each with a subscript (x) attached. However, the equations (1), (2), (3), ... are used as they are to derive the said equivalents.

Figure 6:
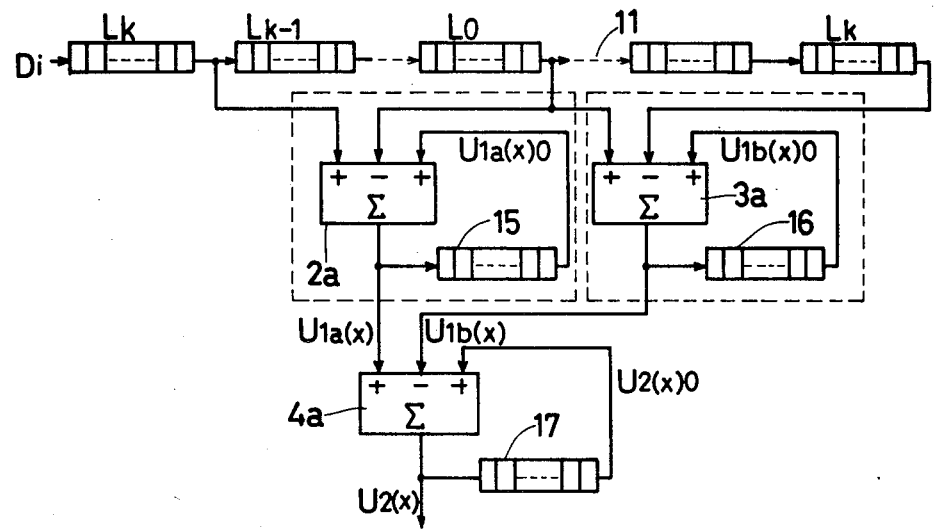
FIGS. 6 and 7 show embodiments of the present invention for filtering an image signal in the sub-scanning direction factor.

FIG. 6 shows a modification of the apparatus of FIG. 1, in which the shift register 1 is replaced by $L_i$ (i=k, ... −k) line memories 11 in a cascade arrangement, each of which comprises (2k+1) elements for storing image signals of one scanning line.

In the thus-constructed line memories 11 are successively stored image signals of (2k+1) scanning lines obtained via the color separation selector 45 from an input scanning device, thereby image signals comprised in a sub-scanning line $d_{i(x)}$ are simultaneously output from each of the $L_i$ line memories. Then the image signals stored in the first line memory $L_k$ (an addition signal) and that stored in th (k+1)th line memory $L_O$ (a subtraction signal) are put to a cumulus computation of a cumulus computer 2a, which outputs the first sum signal $U_{1a(x)}$ to a line memory 15. The line memory 15 outputs the cumulus signal $U_{1a(x)O}$, the computation resultant of the image signals of the previous sub-scanning line, by which the cumulus computer 2a is operable. In the meantime, the image signal stored in the (k+1)th line memory $L_O$ (an addition signal) and that stored in the (2k+1)th line memory $L_{-k}$ (a subtraction signal) are put to a cumulus computation of a cumulus computer 3a to output the second sum signal $U_{1b(x)}$ to a line memory 16. The line memory 16 outputs the cumulus signal $U_{1b(x)O}$ of the previous computation in the same way as the line memory 15. The thus-obtained first sum signal $U_{1a(x)}$ and the second sum signal $U_{1b(x)}$ are put to a cumulus computation of a cumulus computer 4a according to the equation (3) to produce a filtered signal $U_{2(x)}$. It should be noted in FIG. 6 that line memories 15, 16 and 17 (or line shift registers) capable of memorizing image data of one scanning line are substituted for the registers 5, 6 and 7.

Figure 7:
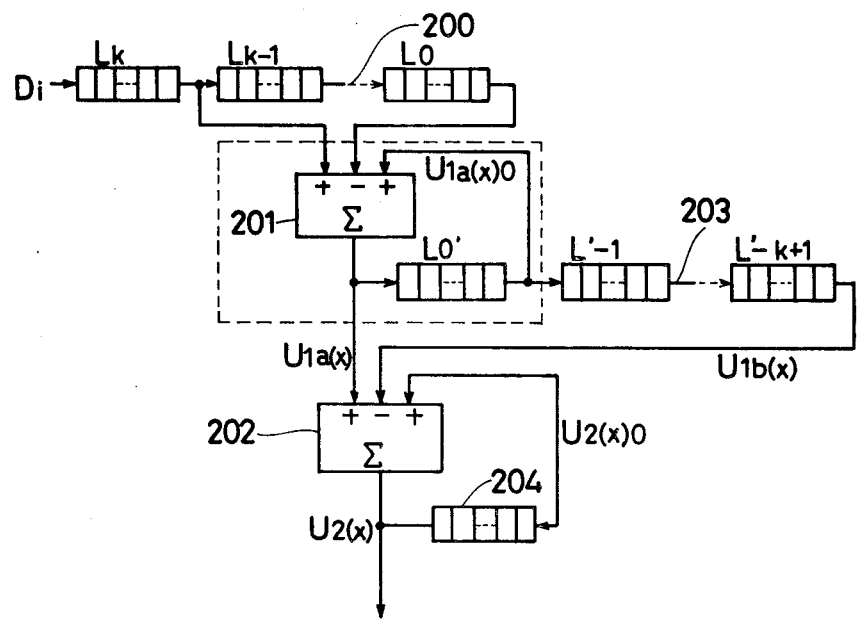

FIG. 7 shows a modification of the apparatus of FIG. 2 to be used for filtering an image signal in the sub-scanning direction factor. In the apparatus of FIG. 7, the shift register 1' shown in FIG. 2 is replaced by $L_i$ (i=k, ... 0) line memories 200 in a cascade arrangement each of which comprises (k+1) elements for storing image signals of one scanning line; the register 5' shown in FIG. 2 is replaced by $L'_i$ (i=0, ... −k+1) line memories 203 in a cascade arrangement each of which comprises k elements for storing image signals of one scanning line; and the register 7 shown in FIG. 2 is replaced by a line memory 204 for storing image signals of one scanning line.

Image signals of (k+1) scanning lines are successively stored in the thus-constructed line memories 200, thereby an image signal comprised in a sub-scanning line $d_{i(x)}$ (i=k, ... 0) are output from each of the $L_i$ line memories 200.

Precisely, the image signal stored in the first line memory $L_k$ (an addition signal) and that stored in the (k+1)th line memory $L_O$ (a subtraction signal) of the line memories 200 are put to a cumulus computation of a cumulus computer 201, which outputs the first sum signal $U_{1a(x)}$ to the line memory 203. At the same time the first line memory $L'_O$ of the line memories 203 outputs the cumulus signal $U_{1a(x)O}$, the computation resultant of the image signals of the previous subscanning line, by which the cumulus computer 201 is operable. In the meantime, the first sum signal $U_{1a(x)}$ output from the line memories 200 and the second sum signal $U_{1b(x)}$ delayed in phase by k elements thereof from the first sum signal $U_{1a(x)}$ are put to a cumulus computation of a cumulus computer to obtain the filtered signal $U_{2(x)}$.

It should be noted incidentally that equivalents of the apparata shown in FIGS. 3 and 4 for the subscanning direction filtering employing line memories instead of the registers can be easily obtained as can be understood from FIG. 7.

Figure 19A:
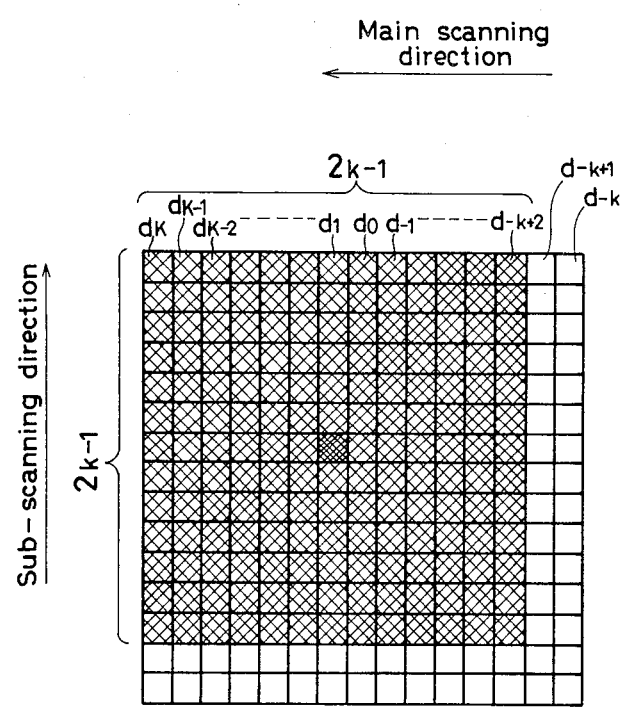
FIG. 19 shows the definitions of signs.

Aside from the above apparata for filtering image signals of a certain number (2k−1) of pixels comprised in one direction, an apparatus can be obtained for filtering image signals of a matrix $(2k-1)^2$ of pixels, as shown in FIG. 19(a) for producing an unsharp signal to be used for a detail emphasis.

It is postulated in the following description that an image signal filtered in the main scanning direction factor is expressed with a subscript (y); an image signal in the sub-scanning direction factor is expressed with a subscript (x); an image signal of the two direction factors is expressed with a subscript (w); and each equation pertaining to a two-dimensional filtering carries a one-dimensionally filtered signal $U_{2i}$ instead of the image signal $d_i$.

Figure 8:
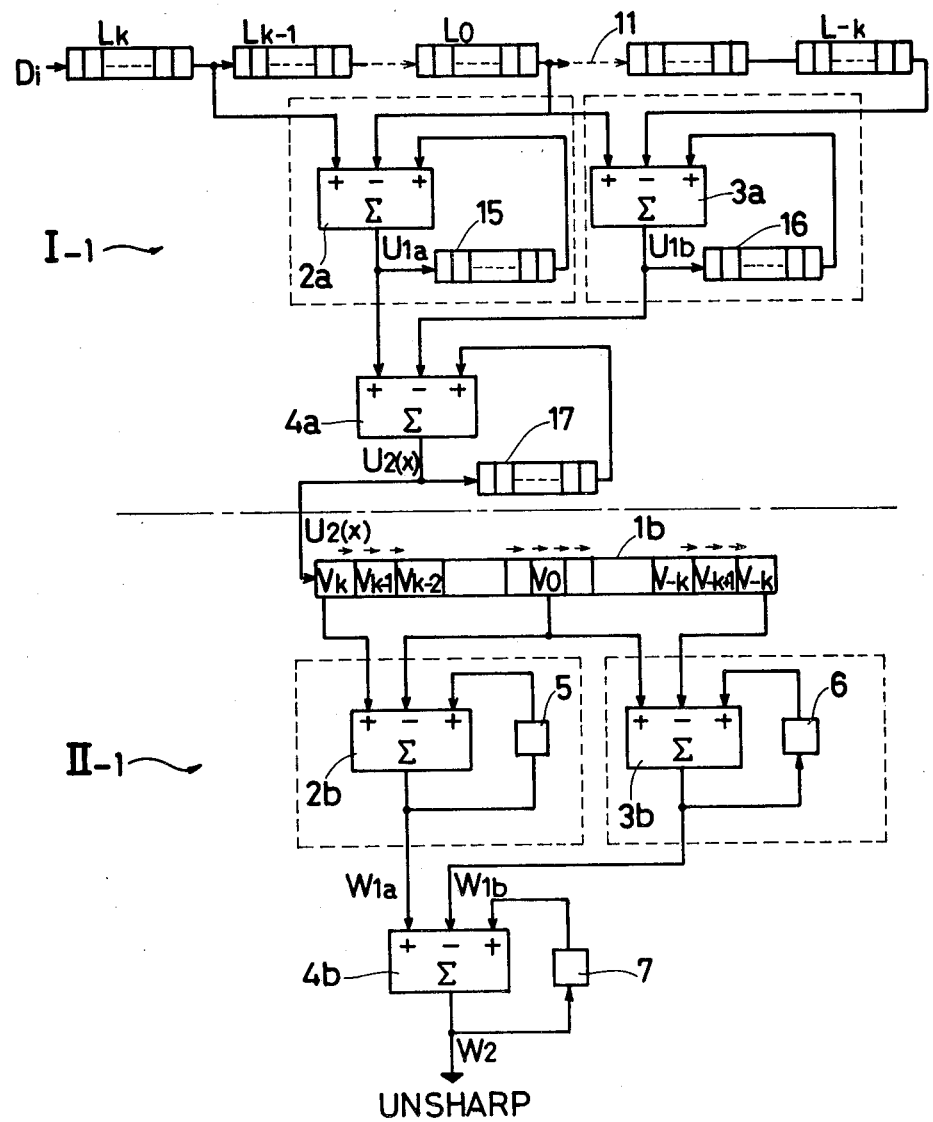
FIGS. 8, 9, 10 and 11 show embodiments of the present invention for filtering an image signal in both the main and the sub-scanning direction factors.

FIG. 8 shows an apparatus for filtering an image signal in two (main and sub-scanning) direction factors, comprising the apparata of FIGS. 6 and 1 arranged in series.

Figure 12A:
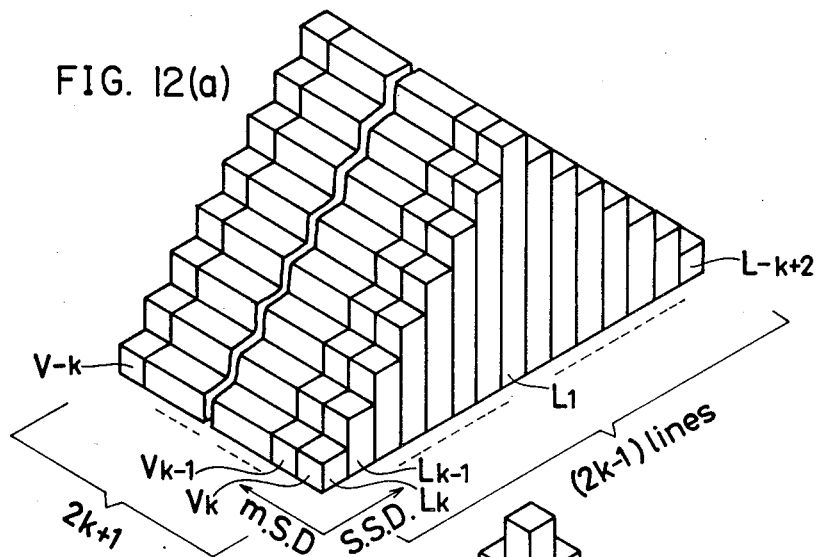
FIG. 12 shows a drawing indicating the conception of filtering image data in the main and the sub-scanning directions.

It has already been mentioned that the filtered signal $U_{2(x)}$ filtered in the sub-scanning direction factor can be obtained from the first state $I_{-1}$ of the apparatus of FIG. 8. Then $(2k+1)$ filtered signals $U_{2(x)}$ are input to a shift register $1b$ of the second stage $I_{-2}$ of the apparatus of FIG. 8. Restating that, image signals weighted by stepwise varying weight coefficients according to a triangular shape in the sub-scanning direction, as shown in FIG. 12(a), are input to $V_i$ ($i=k, \ldots -k$) elements of the register $1b$.

The thus-filtered (weighted) unsharp signal $U_{2i}$ stored in the $V_i$ elements of the shift register $1b$ is processed in the same manner as mentioned for the apparatus of FIG. 1. Consequently, a third signal $W_{1a}$ is obtained from a cumulus computer $2b$ according to an equation:

$$W_{1a} = \sum_{i=k}^{1} U_{2i}, \qquad (10)$$

which corresponds to the equation (1). Meanwhile, a fourth sum signal $W_{1b}$ is obtained from a cumulus computer $3b$ according to an equation:

$$W_{1b} = \sum_{i=o}^{-k+1} U_{2i}, \qquad (20)$$

which corresponds to the equation (2).

Figure 12B:
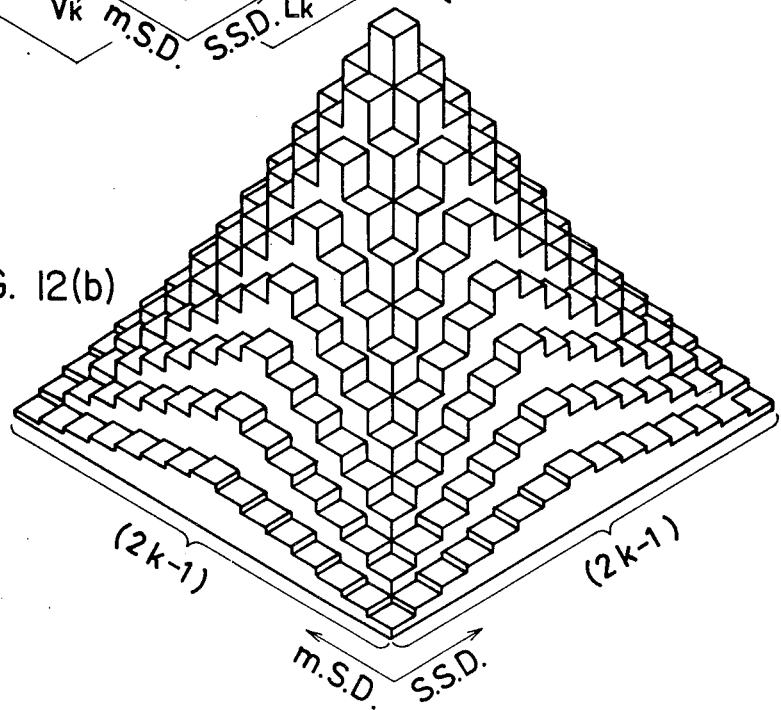

Subsequently, a filtered signal $W_2$ is obtained from a cumulus computer $4b$ according to an equation:

$$W_2 = \sum_{i=k}^{1}(k-i+1)U_{2i} + \sum_{i=o}^{-k+2}(k+i-1)U_{2i} - k \cdot U_{21}, \qquad (30)$$

which corresponds to the equation (31), and further to the equation (3). The signal $W_2$ represents the total sum of the $(2k-1) \times (2k-1)$ image signals weighted by stepwise varying weight coefficients according to a pyramid shape in the main and the sub-scanning directions as shown in FIG. 12(b). It should be noted in this regard that the number of the image signals in the main scanning direction subjected to a filtering process is, in principle, made to be equal to that of the image signals in the sub-scanning direction. However, the numbers can also be different.

Figure 9:
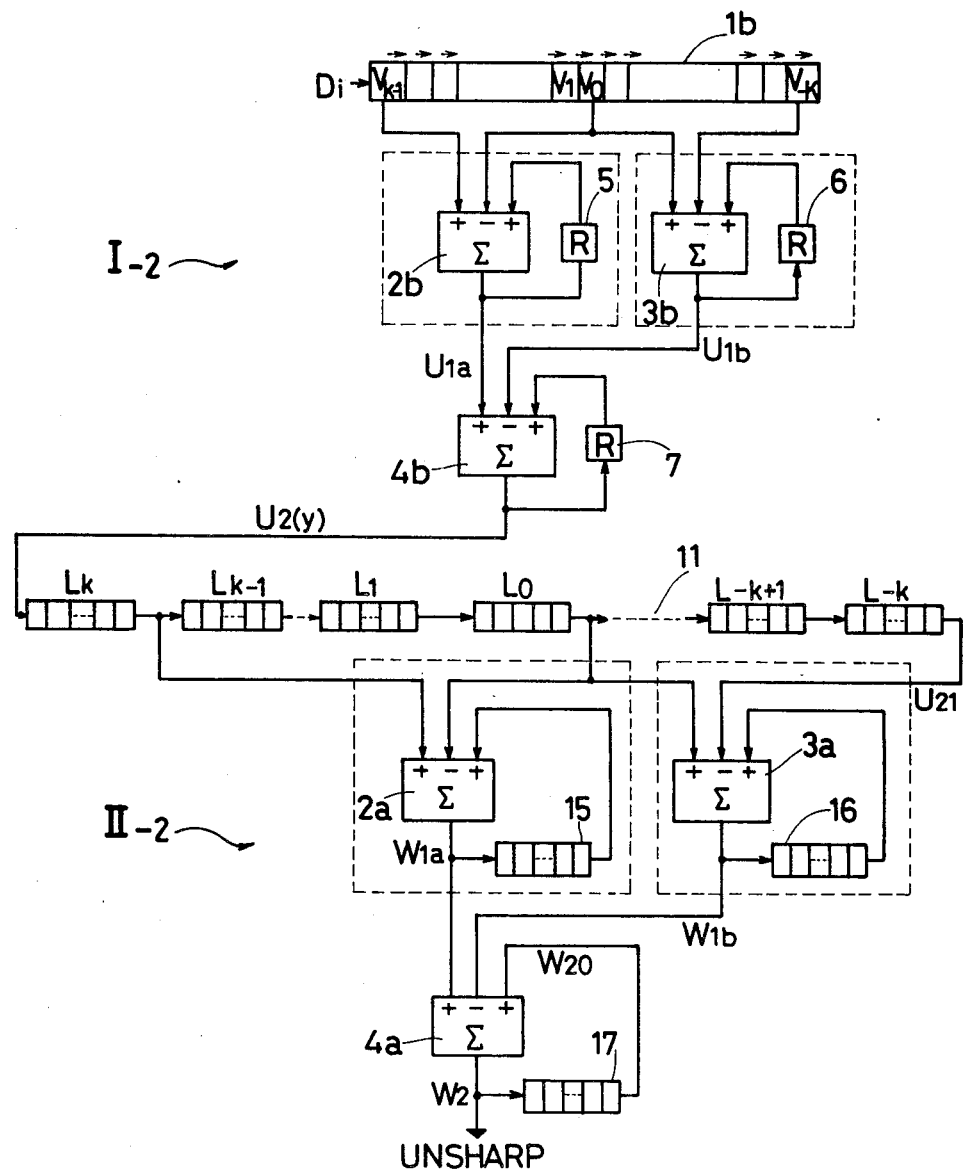

FIG. 9 shows a modification of the apparatus of FIG. 8 in which an image signal is filtered first in the sub-scanning direction factor and filtered second in the main scanning direction factor.

It is obvious that a filtered signal $U_{2(y)}$ filtered in the main scanning direction factor can be obtained from the first state $I_{-2}$ of the apparatus of FIG. 9. The one-dimensionally filtered signals $U_{2(y)}$ are input to line memories 11. Each line memory $L_i$ ($i=k, \ldots -k$) of the line memories 11 can store filtered image signals of one scanning line as explained for the apparatus of FIG. 6. Therefore, image signals $U_{2i}$ ($i=k, \ldots -k$) comprised in an identical sub-scanning line are output from each line memory $L_i$. As is obvious from the description of the apparatus of FIG. 6, the third sum signal $W_{1a}$ is obtained from the cumulus computer $2a$ according to the equation (10); the fourth sum signal $W_{1b}$ is obtained from the cumulus computer $3a$ according to the equation (20); and eventually a two-dimensionally filtered signal $W_2$ is produced by a cumulus computer $4a$ using the first and the second sum signals $W_{1a}$ and $W_{1b}$ according to the equation (30).

Figure 10:
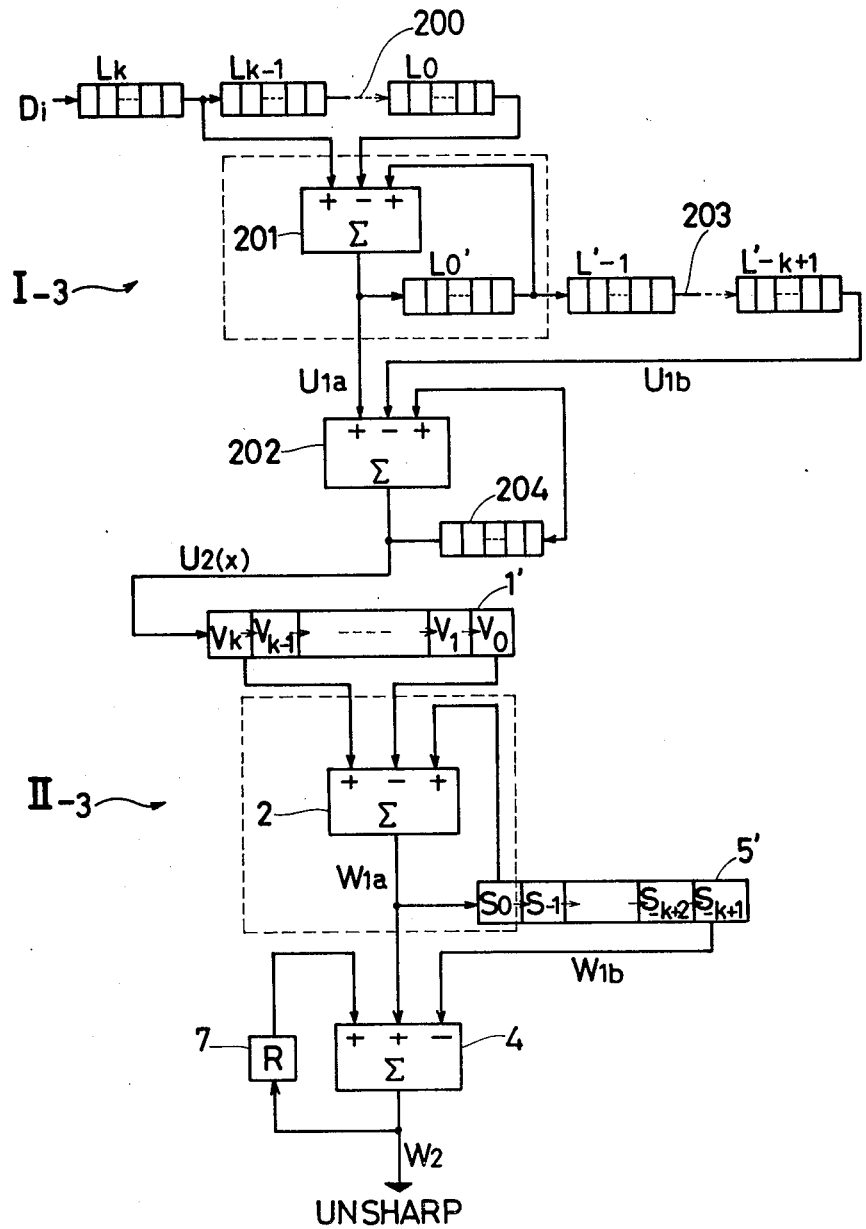

FIG. 10 shows an apparatus comprising a combination of the apparatus of FIG. 7 (the first stage $I_{-3}$) for the signal filtering in the sub-scanning direction factor and the apparatus of FIG. 2 (the second stage $II_{-3}$) for the signal filtering in the main scanning direction factor, by which a two-dimensionally filtered signal $W_2$ is produced.

It is already mentioned in the description of the apparatus of FIG. 7 that the filtered signal $U_{2(x)}$ filtered in the sub-scanning direction factor can be obtained from the first state $I_{-3}$. The filtered signal $U_{2(x)}$ is input to the shaft register $1'$ comprising $(k+1)$ elements, and then the signal filtering process is carried out as mentioned for the apparatus of FIG. 2 to produce the two-dimensionally filtered signal $W_2$.

Figure 11:
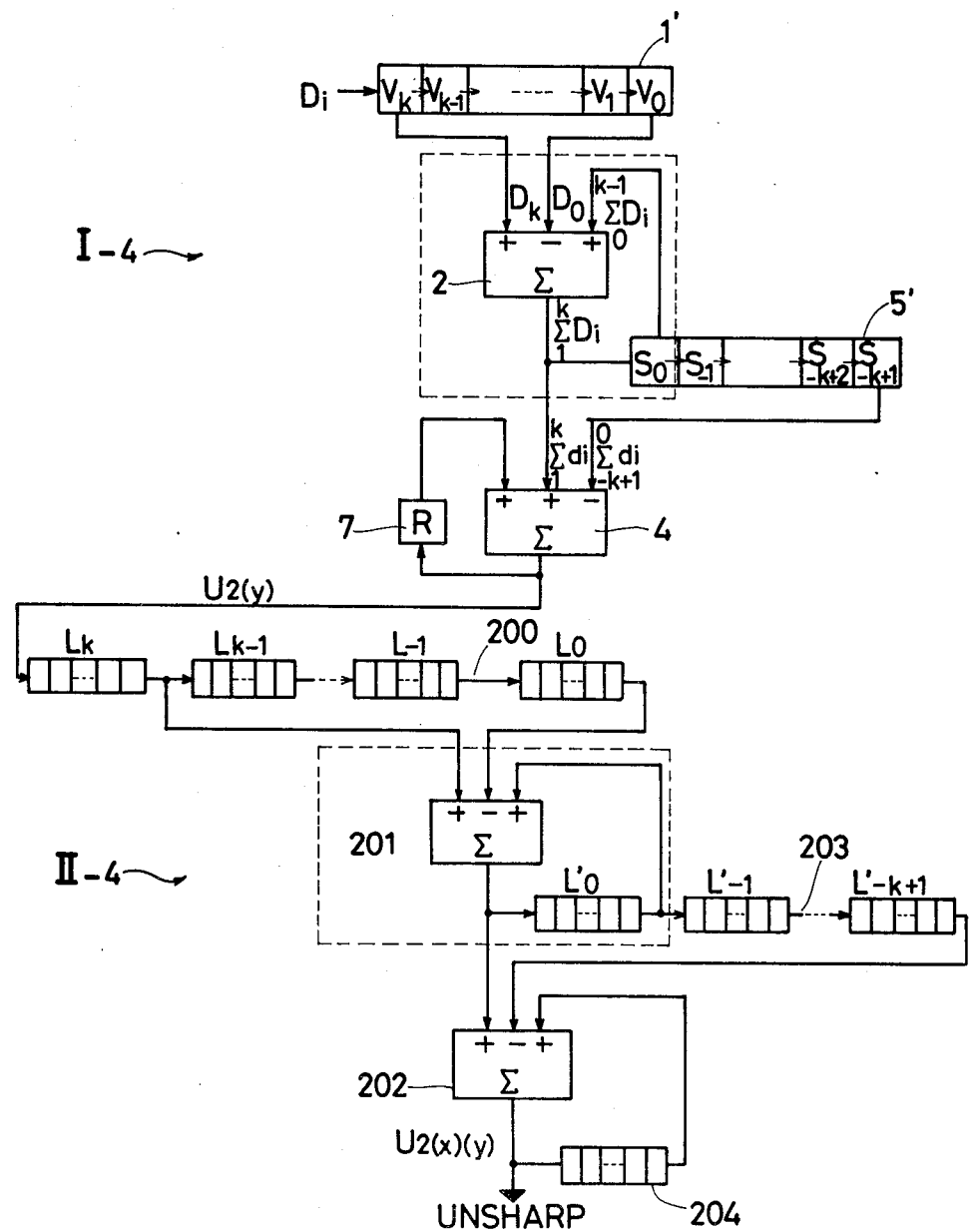

FIG. 11 shows an apparatus comprising a combination of the apparatus of FIG. 2 (the first stage $I_{-4}$) for the signal filtering of the main scanning direction factor and the apparatus of FIG. 7 (the second stage $II_{-4}$) for the signal filtering of the sub-scanning direction factor, by which a two-dimensionally filtered signal is produced. This apparatus has a converse construction of the apparatus of FIG. 10.

As mentioned in detail in the description of the apparatus of FIG. 2, a filtered signal $U_{2(y)}$ filtered in the main scanning direction factor is obtained from the first stage $I_{-4}$. The filtered signal $U_{2(y)}$ is input to $L_i$ ($i=k, \ldots 1, 0$) line memories 200 comprising $(k+1)$ elements, and then a filtered signal $U_{2i}$ filtered in the sub-scanning direction factor is obtained. Subsequently, as mentioned in detail in the description of the apparatus of FIG. 7, the third sum signal $W_{1a}$ is output from the cumulus computer 201, meanwhile, the fourth sum signal $W_{1b}$ is obtained from the last line memory $L_{-k+1}$ of line memories 203 in a cascade arrangement. Then, by using the two sum signals $W_{1a}$ and $W_{2b}$, the filtered signal $W_2$ is obtained according to the equation (30). Since this process can be understood from FIGS. 12(a) and (b) (it should be noted that the main scanning direction filtering process and the sub-scanning direction filtering process are reversed), no detailed explanation for the process is given here.

It is noteworthy in this connection that the two-dimensionally filtered signal can be obtained by a combination of the apparatus of FIG. 1 and the apparatus of FIG. 7, or a combination of the apparatus of FIG. 2 and the apparatus of FIG. 6 other than the aforesaid apparata.

Figure 13:
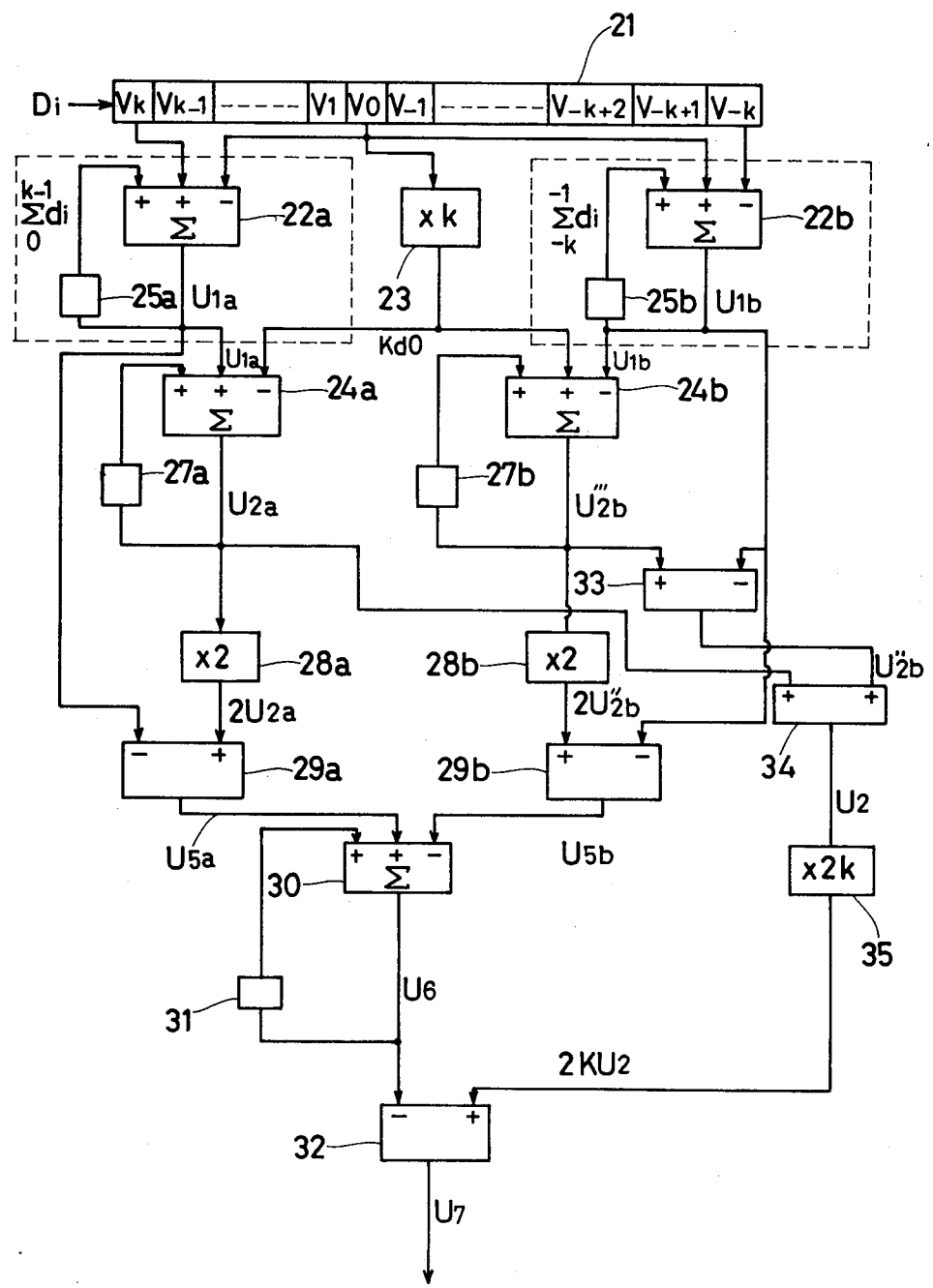
FIG. 13 shows an embodiment of the present invention for filtering an image signal by a weight coefficient of a quadratic function.

FIG. 13 shows an apparatus for imposing a weight coefficient C which varies in accordance with a quadratic function which increases from edge image signals to the kth image signal (the position of the image signal is represented by the value l). The apparatus of FIG. 13 comprises three cumulus computation stages. Since the first cumulus computation stage by means of cumulus computers 22a and 22b is already mentioned in the description of the apparatus of FIG. 1, no explanation for the stage is given here. The second cumulus computation stage is carried out by means of cumulus computers 24a and 24b. In detail, the first sum signal $U_{1a}$ (obtained from the first cumulus computer 22a) and the product $k \cdot d_O$ (obtained by multiplying the image signal $d_O$ registered in the element $V_O$ of the shift register 21 by k in a multiplier 23) are put to a cumulus computation of a cumulus computer 24a to produce the signal $U_{2a}$. In the meantime, the second sum signal $U_{1b}$ obtained from a cumulus computer 22b *and the said product* $k \cdot d_O$ are put to a cumulus computation of a cumulus computer 24b to produce a filtered signal expressed by an equation:

$$U'''_{2b} = \sum_{i=0}^{-k+1} (k+i) d_i. \qquad (40)$$

Figure 21D:
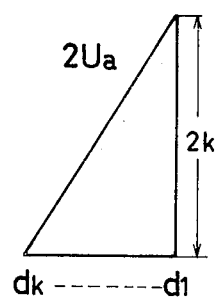

The signal $U_{2a}$ obtained from the cumulus computer 24a is, after being multiplied by two in a multiplier 28a, input to a subtractor 29a as a signal $2U_{2a}$ (refer to FIG. 21(d)). The subtractor 29a subtracts the data $U_{1a}$ obtained from the cumulus computer 22a from the said signal $2U_{2a}$ to produce a signal $U_{5a}$ expressed by an equation:

$$U_{5a} = \sum_{i=k}^{1} (2k - 2i + 1) d_i. \qquad (41)$$

Figure 21E:
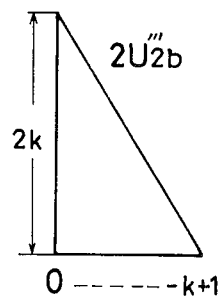

In the meantime, the data $U'''_{2b}$ obtained from the cumulus computer 24b is, after being multiplied by two in a multiplier 28b, input to a subtractor 29b as a signal $2U'''_{2b}$ (refer to FIG. 21(e)). The subtractor 29b subtracts the second sum signal $U_{1b}$ obtained from the cumulus computer 22b from the said signal $2U'''_{2b}$ to produce a signal $U_{5b}$ expressed by an equation:

$$U_{5b} = \sum_{i=0}^{-k+1} (2k + 2i - 1) d_i. \qquad (42)$$

Figure 21F:
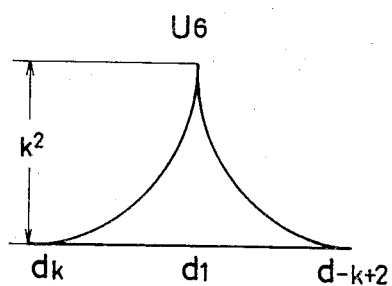

Then the signal $U_{5a}$ from the subtractor 29a and the signal $U_{5b}$ from the subtractor 29b are input to a cumulus computer 30 respectively as addition and subtraction signals. Consequently, the cumulus computer 30 outputs a signal $U_6$ (refer to FIG. 21(f)) expressed by an equation:

$$U_6 = \sum_{i=k}^{1} (k - i + 1)^2 d_i + \sum_{1}^{-k+2} (k + i - 1)^2 d_i - k^2 d_1, \qquad (43)$$

which is indicative of the sum of products of all the image signal $d_k, \ldots d_1, d_O, \ldots d_{-k+2}$ registered respectively in the elements $V_k, \ldots V_1, V_O, \ldots V_{-k+2}$ and weight coefficients varied in accordance with the quadratic function $C = l^2$.

For reference, Table 2 provides the transit of the image signal in the cumulus computer 30 to the final obtainment of the signal $U_6$ (this is used as an unsharp signal) represented by the equation (43).

TABLE II

| NUMBER OF CLOCK PULSES | CUMULUS COMPUTER 30 |
|---|---|
| 1 | $1^2 D_1$ |
| 2 | $1^2 D_2 + 2^2 D_1$ |
| . | . |
| . | . |
| k | $1^2 D_k + 2^2 D_{k-1} + \ldots + k^2 D_1$ |
| k+1 | $1^2 D_{k+1} + 2^2 D_k + \ldots + k^2 D_2 + \{k^2 - (2k-1)\} D_1 =$ $1^2 D_{k+1} + 2^2 D_k + \ldots + k^2 D_2 + (k-1)^2 D_1$ |
| . | . |

TABLE II-continued

| NUMBER OF CLOCK PULSES | CUMULUS COMPUTER 30 |
|---|---|
| . | . |
| 2k−1 | $1^2 D_{2k-1} + 2^2 D_{2k-2} + \ldots + k^2 D_k + (k-1)^2 D_{k-1} + \ldots + 1^2 D_1$ |
| . | . |
| . | . |

The filtered data $U'''_{2b}$ can be expressed by an equation:

$$U'''_{2b} = \sum_{i=o}^{-k+1} (k+i) d_i = \sum_{i=1}^{-k+2} (k+i-1) d_i - \qquad (44)$$

$$kd_1 + \sum_{i=o}^{-k+1} d_i$$

and can be modified to:

$$U'''_{2b} = U_{2b} - k \cdot d_1 + U_{1b} \qquad (45),$$

and further to:

$$U_{2b} - k \cdot d_1 = U'''_{2b} - U_{1b} \qquad (46).$$

For the reason, the difference between the second and the third terms of the right member of the equation (34) can be obtained from the subtractor 33 which subtracts the signal $U_{1b}$ from the signal $U'''_{2b}$. In this connection, it is obvious from the equation (34) that the filtered signal $U_2$ can be obtained by summing the output signal of the subtractor 33 and the filtered signal $U_2$ output from the cumulus computer 24a in an adder 34.

Figure 21G:
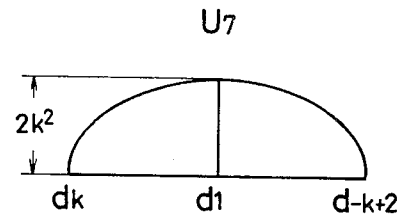

It should be noted that a signal $U_7$ (refer to FIG. 21(g)) to be used as an unsharp signal expressed by:

$$U_7 = \sum_{i=k}^{-k+2} [k^2 - (i-1)^2] d_i, \qquad (47)$$

which represents the sum of products of image signals and weight coefficients $C = 1 (2k-1)$, can be obtained by subtracting in the subtractor 32 the signal $U_6$ (output from the cumulus computer 30) from a signal obtained by multiplying the signal $U_2$ by 2k in the multiplier 35.

Figure 14:
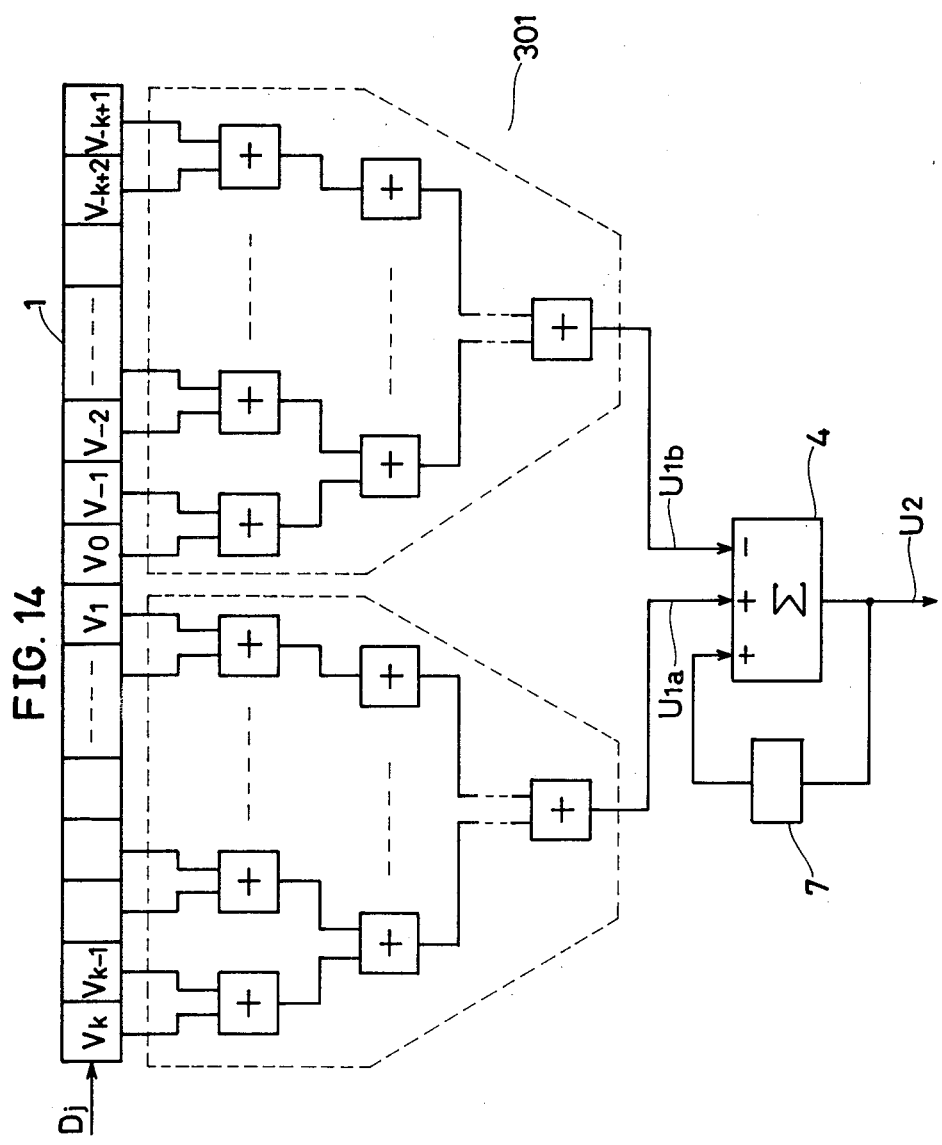
FIG. 14 shows an embodiment of the present invention for filtering an image signal in the main scanning direction factor.

In the apparata of FIGS. 1 through 13, the first and the second sum signals $U_{1a}$ ($U_{1a(x)}$, $U_{1a(y)}$) and $U_{1b(x)}$, $U_{1b(y)}$) are obtained by means of cumulus computers, particularly the first and the second sum signals of the main scanning direction factor can be alternatively obtained by means of an apparatus as shown in FIG. 14.

It is of course to be recognized that the apparatus as shown in FIG. 14 can be used for producing the third and the fourth sum signals as mentioned with reference to the apparata of FIGS. 8 through 11.

In the apparatus of FIG. 14, image signals $d_i$ ($i = K, \ldots -k+1$) of one scanning line from the color separation selector 45 are successively input to $V_i$ ($i = k, \ldots -k+1$) elements of a shift register 1 according to the manner mentioned with respect to the apparatus of FIG. 1.

The image signals $d_k$ through $d_l$ registered in the elements $V_k$ through $V_l$ of the shift register 1 are input to adders 300 in a tree arrangement to be summed according to the equation (1), which finally outputs the first sum signals $U_{la}$. In the meantime, the sum of the image signals $d_O$ through $d_{-k+l}$ registered in the elements $V_O$ through $V_{-k+l}$ are computed by adders 301 in a tree arrangement according to the equation (2) to finally output the second sum signal $U_{lb}$.

As can be understood from FIG. 14, the image data registered in each adjoining two elements of the shift register 1 are summed in the first stage, and then the oututs of the adjoining two adders are summed in the subsequent stages finally to output a sum signal.

The thus-obtained sum signals $U_{la}$ and $U_{lb}$ are input to a cumulus computer 4 respectively as addition and subtraction signals, by which the cumulus computer 4 carries out a computation corresponding to the equation (3) to output the filtered signals $U_2$.

Figure 15:
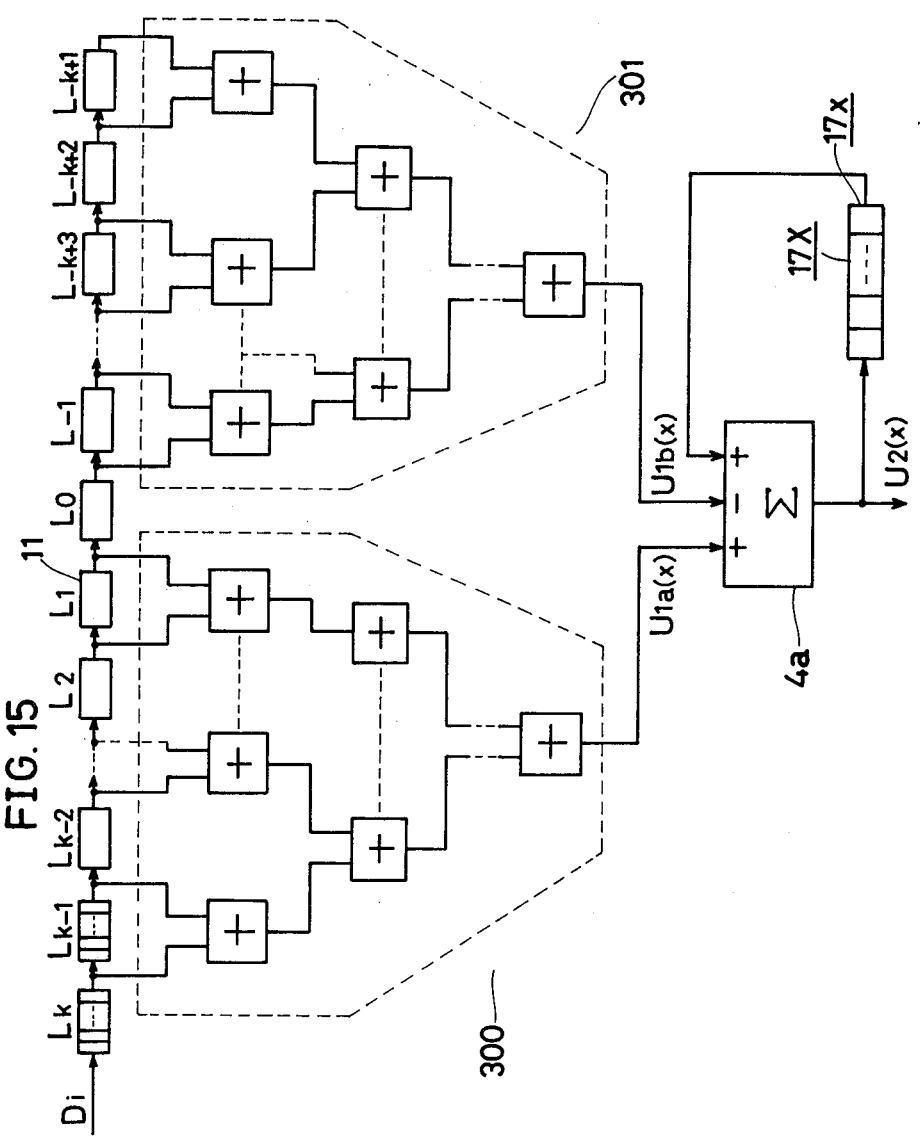
FIG. 15 shows an embodiment of the present invention for filtering an image signal in the sub-scanning direction factor.

FIG. 15 shows an apparatus for producing the first and the second sum signals of the sub-scanning direction factor $U_{la(x)}$ and $U_{lb(x)}$ by means of two groups of adders in a tree arrangement. In the apparatus of FIG. 15, image signals obtained by scanning an original via color separation selector 45 are successively input to $L_i$ ($i=k$, ... $-k+1$) line memories 11 in a cascade arrangement of 2k stages, each of which is capable of storing image signals of one scanning line. Consequently, 2k image signals comprised in one sub-scanning line can be obtained from the line memories $L_i$ ($L_k$ through $L_{-k+l}$). Of the image signals obtained from the line memories $L_i$, the image signals output from the line memories $L_i$ ($i=0, \ldots, -k+1$) are input to address 301 in a tree arrangement. Subsequently, the adders 300 in a tree arrangement output a sum signals $U_{la(x)}$ equivalent to the signal $U_{la}$, the resultant of the equation (1), while the adders 301 in a tree arrangement output a sum signal $U_{lb(x)}$ equivalent to the signal $U_{lb}$, the resultant of the equation (2). Eventually, the signals $U_{la(x)}$ and $U_{lb(x)}$ are put to a cumulus computation of the cumulus computer 4 to produce a filtered signal $U_{2(x)}$ equivalent to the resultant $U_2$ of the equation (3). In this regard, there is of course necessary a line memory 17 as a signal storage means for storing image signals of one scanning line.

It should be incidentally noted that the apparata in which the first and the second sum signals are obtained by means of adders in a tree arrangement as shown in FIGS. 14 and 15 can also be applied to obtain the first, second, third and fourth sum signals in an apparatus as mentioned below for filtering an image signal two-dimensionally.

Figure 16:
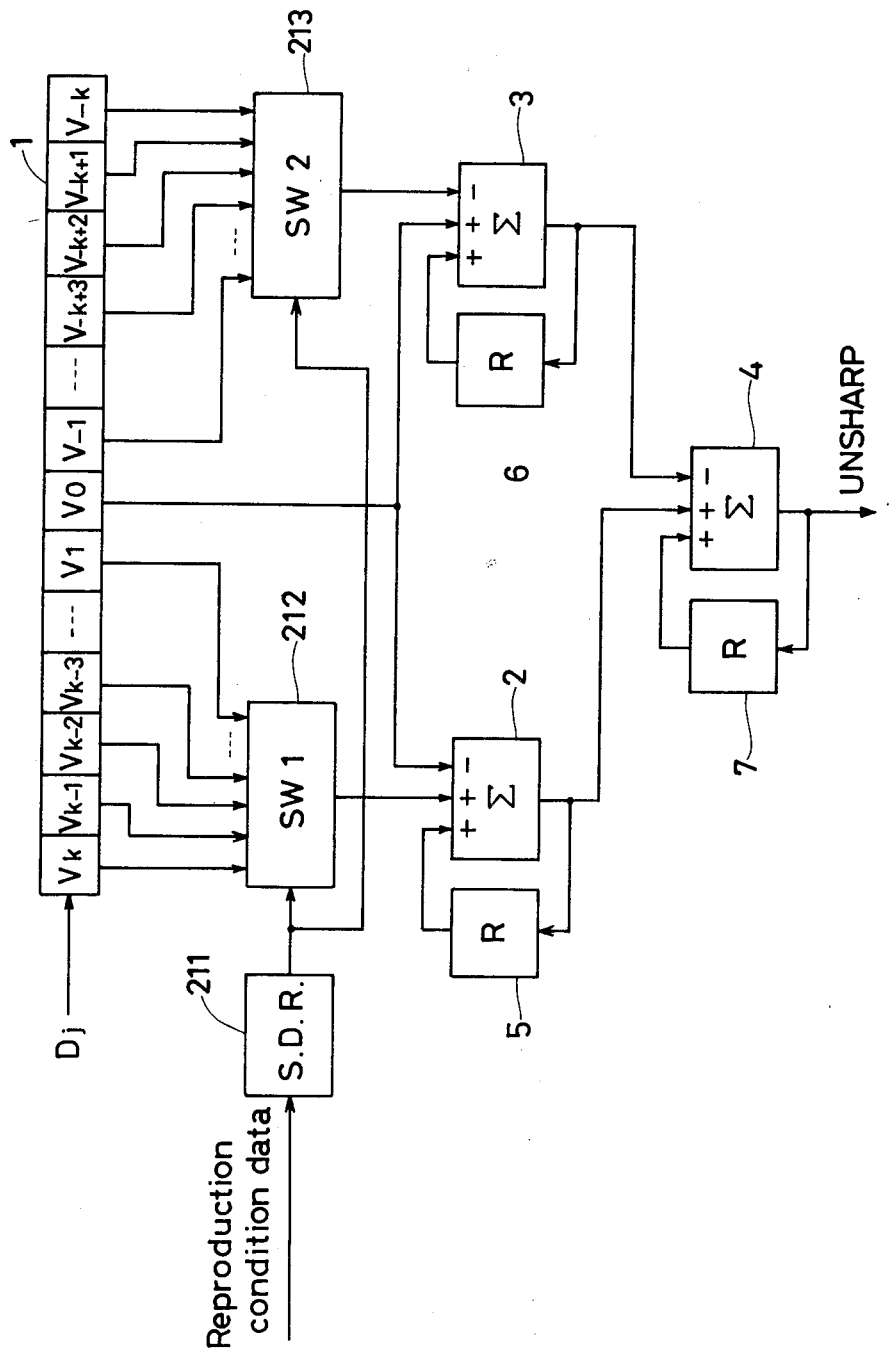
FIGS. 16 and 17 show embodiments of the present invention for varying the intervals between image signals to vary the aperture of an unsharp signal.

FIG. 16 shows a modification of the apparatus of FIG. 1, in which the number of image signals to be subjected to a filtering process at a time can be varied to change the aperture of the unsharp signal U (mask size) according to the sort of an image to be filtered (for instance, a small mask size is used to filter a literal or drawing image, while a large mask size is used to filter a pictorial image). Specifically, the numbers of image signals stored in the elements $V_k$ to $V_l$ and those stored in the elements $V_{-1}$ to $V_{-k}$ of the shift register 1 are respectively controlled symmetrically about the image data stored in the element $V_O$ of the register 1 by switching means 212 and 213 (such as a selector or a multiplexer) in being input to cumulus computers 2 and 3, as respective addition and subtraction signals.

In order to make the switching means 212 and 213 operable, a mask size designation register (a kind of decoder) 211 provides the cumulus computers 2 and 3 with an information signal specifying the number of image signals to be subjected to the filtering process according to reproduction condition data (such as mag-nification ratio, screen ruling, and the sort of image) to determine the aperture of the unsharp signal U (mask size).

Figure 17:
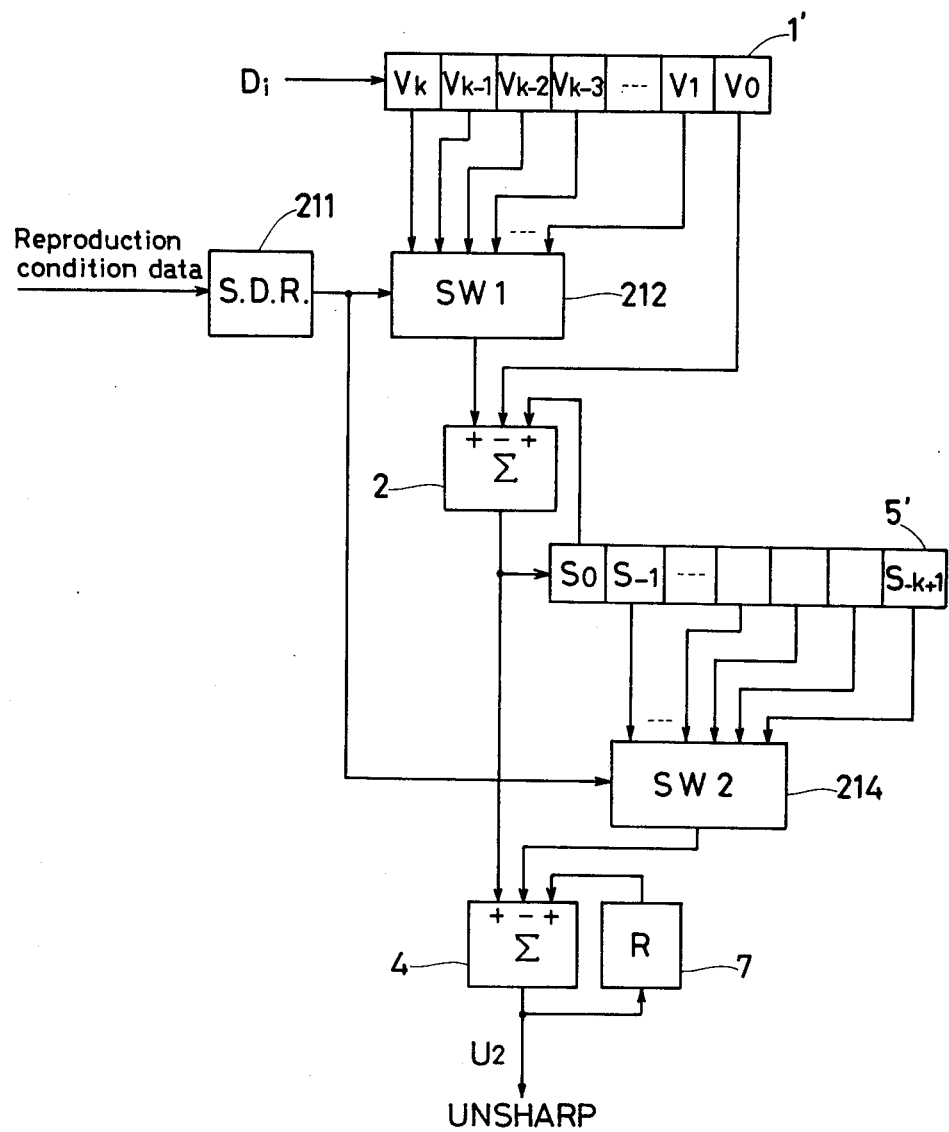

FIG. 17 shows a modification of the apparatus of FIG. 2, in which the number of image signals to be subjected to a filtering process at a time can be varied. In this case, the mask size designation register 211 provides a switching means 214 with an information signal specifying the number of image signals to be input from the shift register 5' to a cumulus computer 4.

FIG. 20(b) shows several cumulus computers with peripheral equipments such as inverters 100 through 107 and adders 108 through 113 for practical operation. In this connection, each of the adders 108 through 113 is usually an integrated circuit, which operates as an adder for the corresponding pairs of signals $A_1$ through $A_4$ and $B_1$ through $B_4$ input to two distinct terminals thereof with a terminal $C_O$ being a common low-level signal terminal, or which operates as a subtractor for an input signal and the inverse of the corresponding one of the other input signals with the terminal $C_O$ being a common high-level signal terminal. The addition or subtraction result signal is output from output terminals $\Sigma_1$ through $\Sigma_4$ and $C_4$. In the apparatus of FIG. 20(b), a D-flip-flop circuit 114 temporarily stores the output from the adders 111, 112 and 113 by one clock pulse interval, and outputs the same to the terminals B1 through B4 of the adders 108 through 110.

The thus-constructed apparatus operates as follow. A set of signals $R_{t=0}$ delayed in phase by one clock pulse interval stored in the D-flip-flop circuit 114 and a set of signals P synchronized with the present clock pulse are summed in the adders 108, 109 and 110 in correspondence, and another set of signals Q synchronized with the present clock pulse is subtracted from the addition result signals of the adders 108, 109 and 110 in the adders 111, 112 and 113. For this reason, the D-flip-flop circuitry 114 is provided to temporarily store cumulus signals.

We claim:

1. A method of producing an unsharp filtering signal for an image signal representing image data obtained from a scanning process in main and sub scanning directions comprising the steps of:
   (a) filtering said image data in at least one direction corresponding to one of said main and sub scanning directions,
   (b) said filtering step comprising processing image signals associated with a matrix of pixels,
   (c) performing a cumulus computation operation on a pair of processed image signals $P_n$ and $Q_n$ obtained from said processing step where n is an input order or computation number of the signals, said cumulus computation defined by $$R_n = R_{n-1} + P_n - Q_n$$

where $R_{n-1}$ is a result of an immediately preceding cumulus computation, and
   (d) utilizing a signal resulting from the cumulus operation performed on the filtered signals in an image generation process.

2. A method as recited in claim 1 wherein said processing step comprises the steps of selecting a predetermined number K of image signals $d_i$ ($i=K, \ldots, 1$) out of 2K image signals obtained from the scanning process representing a scan in said one of said main and subscanning directions, summing the selected number of signals to produce said first signal, and summing the remaining K image signals to produce said second signal.

3. A method as recited in claim 2 wherein said filtering step comprises the further step of processing the image data in the other of said main and sub scanning directions by obtaining from said signals filtered in said one direction further first and second signals and subjecting said further first and second signals to a further cumulus computation.

4. A method as recited in claim 2 wherein said 2K image signals represent two data sequences, K computations apart, and said first selecting step comprises the step of selecting substantially all of K sequential signals in a scan in one direction, and said remaining K image signals represent a sequence forming the first signal of a $K^{th}$ previous computation, said second summing step providing a sum of a sequence forming a first signal of a $K^{th}$ previous computation.

5. Apparatus for filtering an image signal in a main scanning direction comprising storage means for receiving a scanning signal in the main scanning direction means for performing a pair of cumulus computations, defined as providing an $n^{th}$ result $R_n = R_{n-1} + P_n - Q_n$ for an $n^{th}$ computation where $R_{n-1}$ is a result of an immediately preceeding computation and where $P_n$ and $Q_n$ are image signals input to said means for performing said cumulus computations, and means for performing a third cumulus computation on results of said pair of said cumulus computations, to provide a filtered signal output representing a filtering of said scanning signal in the main scanning direction, said means for performing a pair of cumulus computations including a structure for performing a first cumulus computation connected for receiving positive and negative inputs from an element of said scanning signal and from an element of said scanning signal delayed by K scan elements, and including a structure for performing a second cumulus computation connected for receiving positive and negative inputs from said element of said scanning signal delayed by K scan elements and from an element of said scanning signal delayed by 2K scan elements, outputs representing said first and second cumulus computations providing positive and negative inputs to said means for performing said third cumulus computation.

6. Apparatus as recited in claim 5 wherein said storage means comprises shift register means having 2K+1 storage stages.

7. Apparatus as recited in claim 5 wherein said means for performing a third cumulus computation includes adding means receiving positive and negative inputs, said adding means having a further positive input connected for receiving after a single delay period an output thereof.

8. Apparatus as recited in claim 7 wherein said means for performing a pair of cumulative computative computations includes a pair of structures substantially identical to said means for performing said third cumulative computation.

9. Apparatus as recited in claim 7 wherein said means for performing a pair of cumulative computations includes first cumulative computing means comprising adding means having a pair of positive inputs and a negative input, said adding means connected for receiving at one of said positive inputs an element of said scanning signal, and connected further for receiving at said negative input an element of said scanning signal after delay by K scan elements, and further connected for receiving at the second positive input an output thereof delayed by one delay period, and said second cumulative computing means comprises shift register means having K stages, a first stage connected to receive an output from said first cumulative computing means, and a $K^{th}$ stage connected to provide an output to a negative input of said adding means of said means for performing said third cumulative computation.

10. Apparatus as recited in claim 9 wherein said storage means comprises further shift register means having K+1 stages, said first stage providing said first positive input to said first cumulative computing means and said $K+1^{th}$ stage providing said negative input to said first cumulative computing means.

11. Apparatus as recited in claim 6 wherein said shift register means a plurality of line memory storage means provided in cascade arrangement, each of said line memory storage means incuding 2K+1 storage cells for elements of one scanning line.

12. Apparatus as recited in claim 5 wherein said means for performing a third cumulus computation includes adding means receiving positive and negative inputs, said adding means having a further positive input delayed by one line scan.

13. Apparatus as recited in claim 12 wherein said structures for performing said first and second cumulus computations are substantially identical to said means for performing said third cumulative computation.

14. Apparatus as recited in claim 13 wherein said plurality of line memory storage means comprises 2K+1 line memory storage means, and an output of a first line storage means and an output of a $K+1^{th}$ line storage means providing positive and negative inputs to said structure for performing said first cumulative computing means, an output from said $K+1^{th}$ line memory storage means and an output from said $2K+1^{th}$ line storage means providing respectively positive and negative inputs to said structure for performing said second cumulus computation.

15. Apparatus as recited in claim 12 wherein the structure for performing the first cumulus computation is substantially identical to said means for performing the third cumulus computation and the structure for performing the second cumulus computation comprises $K-1$ line memory storage means connected in cascade with the line memory storage means at the output of said structure for performing the first cumulus computation, an output of the last of said $K-1$ line memory storage means providing a negative input for said means for performing a third cumulus computation.

16. Apparatus as recited in claim 8 wherein said storage means comprises shift register means having 2K+1 storage elements further comprising means for imposing a weight coefficient increasing from edge image signals to a $K^{th}$ image signal, including fourth and fifth cumulus computation means each substantially identical to said means for performing a third cumulus computation, multiplying means connected to a K+1th stage of said shift register means for multiplying by K a signal stored therein, said multiplying means and the output of said adding means in said structure for performing said first cumulus computation provided to said fourth cumulus computation means as negative and positive inputs, respectively, the output of said multiplying means and of said adding means of said structure for performing said second cumulus computation provided as positive and negative inputs to said fifth cumulus computation means, first and second subtracting means connected for subtracting outputs of said structures for performing said first and second cumulus computations from multiples of outputs of said fourth and fifth cumulus computation means said first and second subtracting means providing positive and negative inputs to said means for performing said third cumulus computation, said output of said means for performing said third cumulus computation providing an unsharp signal for input to a third subtracting means for subtraction from a multiple of a sum of an output of said fourth cumulus computation means and a difference between the output of said fifth cumulus computation means and the output of said structure for performing said second cumulus computation, to provide an unsharp signal weighted by weight coefficients varying in accordance with a quadratic function increasing from edge image signals to the $K^{th}$ image signal.

17. An apparatus for filtering an image signal in reproducing images by means of an image reproduction system, in which a cumulus computation expressed by:

$$R_n = R_{n-1} + P_n - Q_n$$

(where n is an input order of each of the signals to the above computation) wherein $P_n$ and $Q_n$ are image signals obtained in synchronism with an input scan to be subjected to the above computation and $R_{n-1}$ is carried out by an apparatus comprising:

(a) a memory means for successively storing and shifting a sequence of a number of image signals comprised of one of a main or a sub-scanning line obtained from an input scanning meas for processing in synchronism with the input scanning means;

(b) a first summing means for obtaining in synchronism with the input scanning means a first sum signal $U_{1a}$ expressed by:

$$U_{1a} = \sum_{i=k}^{1} d_i$$

by summing a predetermined number (K) of image signals $d_i$ (i: K, K−1, ... 1) of 2K image signals $d_i$ (i: K, ..., 0, 1, −1, ..., K+1) in a sequence stored and shifted in accordance with the input scanning means;

(c) a second summing means for obtaining in synchronism with the obtaining of the first sum signal by said first summing measn a second sum signal $U_{1b}$ expressed by:

$$U_{1b} = \sum_{i=0}^{-K+1} d_i$$

by summing the remaining (K) image signals; and (d) a cumulus computation means for obtaining a filtered signal $U_2$ expressed by:

$$U_2 = \sum_{i=K}^{1}(K - i + 1)d_i + \sum_{i=1}^{-K+2}(K + i - 1)d_i - Kd_1$$

according to the input scanning means by subjecting the first and second sum signals $U_{1a}$ and $U_{1b}$ to said cumulus computation as respective addition and subtraction signals for the (2K−1) image signals $d_i$ (i: K, ... −K−1) in a sequence.

18. Apparatus as recited in claim 11 wherein said means for performing a third cumulus computation includes adding means receiving positive and negative inputs, said adding means having a further positive input delayed by one line scan.

* * * * *